(12) United States Patent
Tsuda

(10) Patent No.: US 11,571,732 B2
(45) Date of Patent: Feb. 7, 2023

(54) CLINCHING FASTENER PRESS-FITTING METHOD AND FASTENING JIG FOR USE IN THE PRESS-FITTING METHOD

(71) Applicant: TSUDA KOGYO CO., LTD., Kakamigahara (JP)

(72) Inventor: Yoshihisa Tsuda, Kakamigahara (JP)

(73) Assignee: TSUDA KOGYO CO., LTD., Gifu (JP)

(*) Notice: Subject to any disclaimer, the term of this patent is extended or adjusted under 35 U.S.C. 154(b) by 8 days.

(21) Appl. No.: 17/285,198

(22) PCT Filed: Sep. 2, 2019

(86) PCT No.: PCT/JP2019/034378
§ 371 (c)(1),
(2) Date: Apr. 14, 2021

(87) PCT Pub. No.: WO2020/079974
PCT Pub. Date: Apr. 23, 2020

(65) Prior Publication Data
US 2022/0055090 A1  Feb. 24, 2022

(30) Foreign Application Priority Data
Oct. 19, 2018  (JP) .............................. JP2018-197145

(51) Int. Cl.
*B21J 15/06* (2006.01)
*B21D 39/03* (2006.01)
*B21J 15/02* (2006.01)

(52) U.S. Cl.
CPC ............ *B21D 39/031* (2013.01); *B21J 15/02* (2013.01)

(58) Field of Classification Search
CPC ...... F16B 37/062; F16B 19/06; F16B 37/068; B23P 19/064; B23P 19/062; B21J 15/04; B21J 15/06; B21J 15/02; B21D 39/031
See application file for complete search history.

(56) References Cited

U.S. PATENT DOCUMENTS 5,161,303 A * 11/1992 Maynard ............... B23P 19/062
221/113
2015/0005945 A1   1/2015 Toh

FOREIGN PATENT DOCUMENTS

JP   49-38875 A    4/1974
JP   50-25676 B1   8/1975
(Continued)

OTHER PUBLICATIONS

International Search Report w/English translation and Written Opinion in Japanese dated Oct. 1, 2019, issued in counterpart International Application No. PCT/JP2019/034378 (7 pages).

*Primary Examiner* — Jun S Yoo
(74) *Attorney, Agent, or Firm* — WHDA, LLP

(57) ABSTRACT

The press-fitting method for press-fitting a plurality of clinching fasteners into a workpiece. The method includes: a drilling step S1 of drilling press-fit holes at press-fitting positions of the workpiece to press-fit first clinching fasteners that are press-fitted from a punch side of a turret punch press by NC control using the turret punch press; a workpiece mounting step S2 of mounting the workpiece so that the workpiece is superposed on a fastening jig that guides the first clinching fasteners; a fastener insertion step S3 of inserting a predetermined number of the first clinching fasteners taken out from a screw feeder into the press-fit holes of the workpiece; a fastener press-fitting step S4 of press-fitting the first clinching fasteners into the press-fit holes of the workpiece by NC control using the turret punch (Continued)

press; and a workpiece removal step S5 of removing the workpiece from the fastening jig.

14 Claims, 30 Drawing Sheets

(56) References Cited

FOREIGN PATENT DOCUMENTS

| | | |
|---|---|---|
| JP | 55-45299 B2 | 11/1980 |
| JP | 59-194346 U | 12/1984 |
| JP | 4-322837 A | 11/1992 |
| JP | 9-78328 A | 3/1997 |
| JP | 2000-233240 A | 8/2000 |
| JP | 2000-288653 A | 10/2000 |
| JP | 3181623 U | 2/2013 |
| JP | 2015-27726 A | 2/2015 |

* cited by examiner

Fig. 1
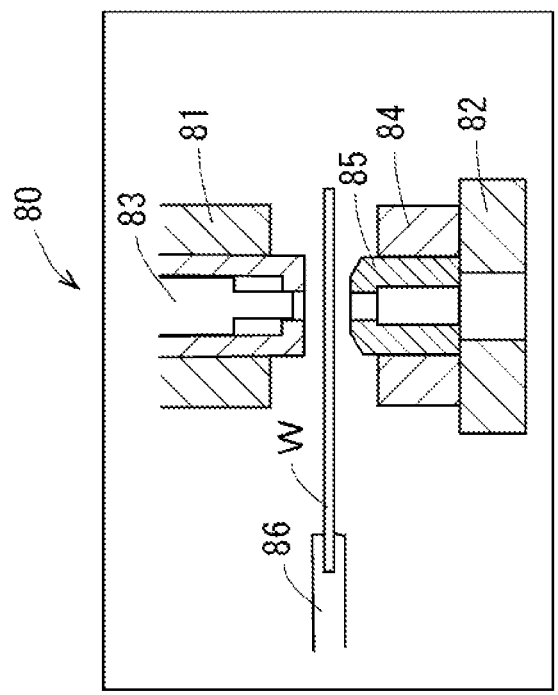
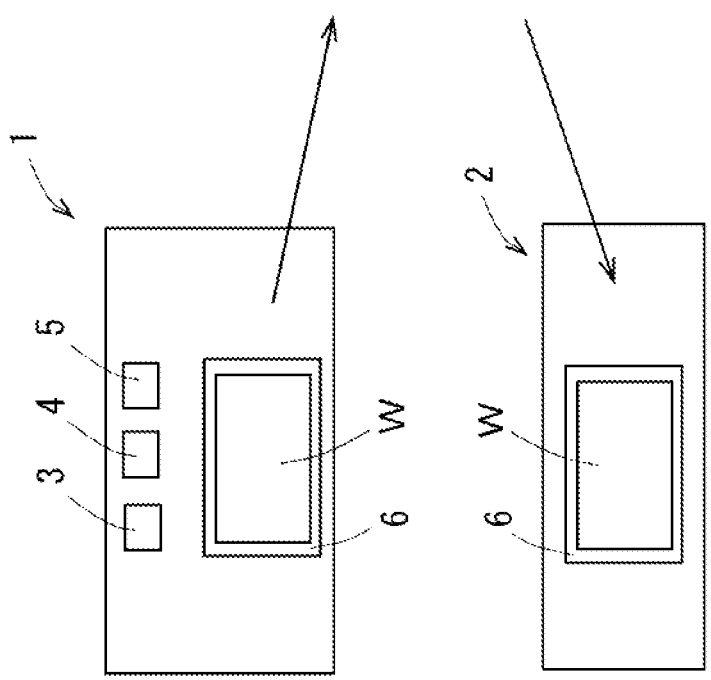

Fig. 5
(1)
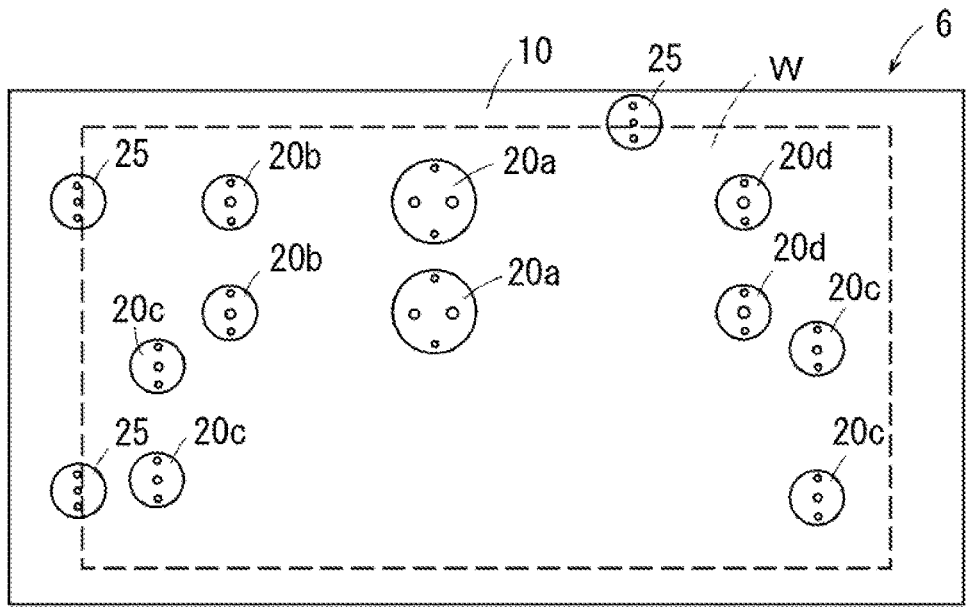
(2)
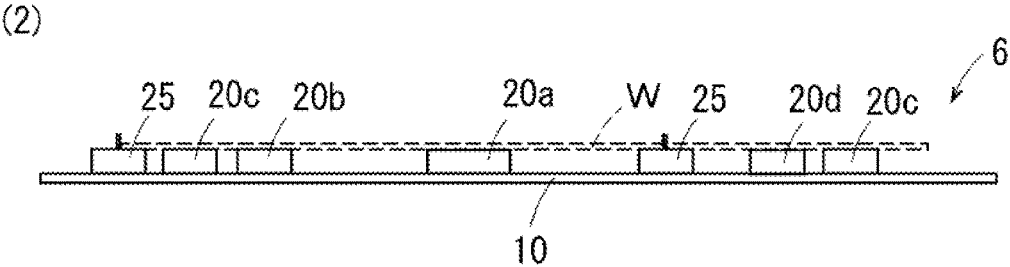

Fig. 16
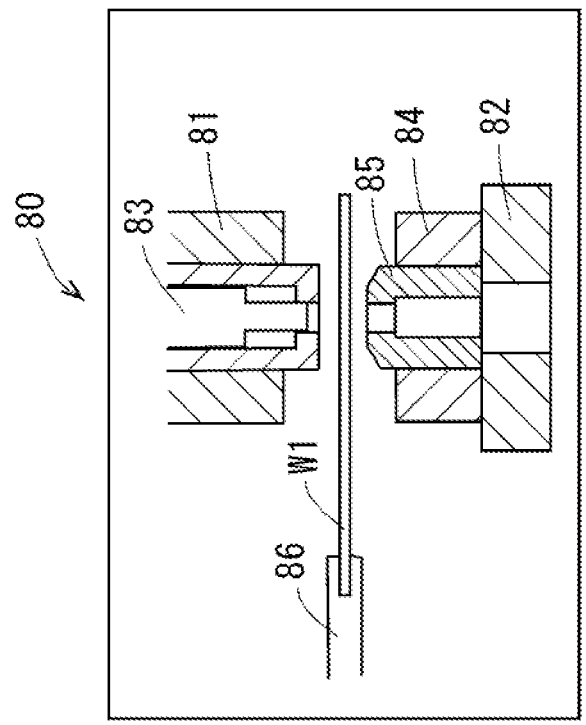
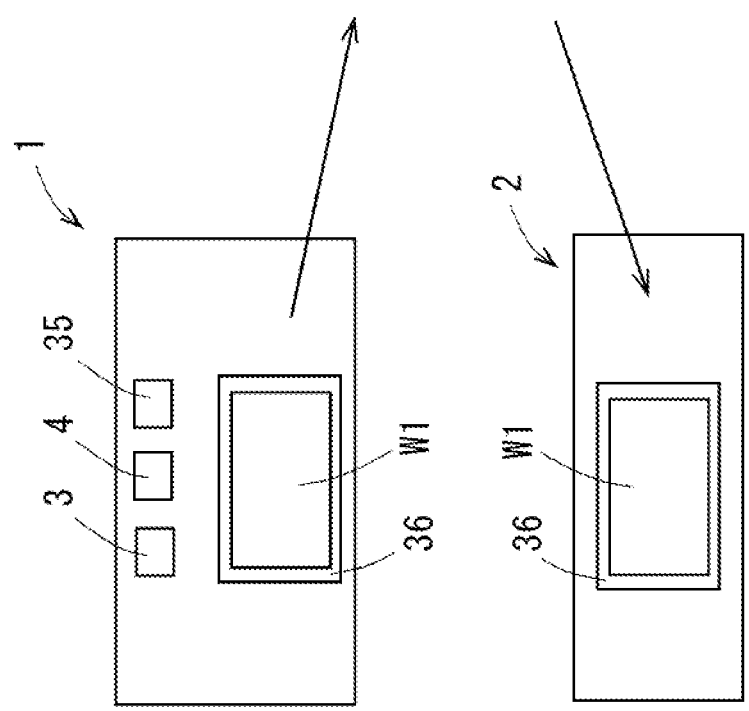

FIG. 31
(1)
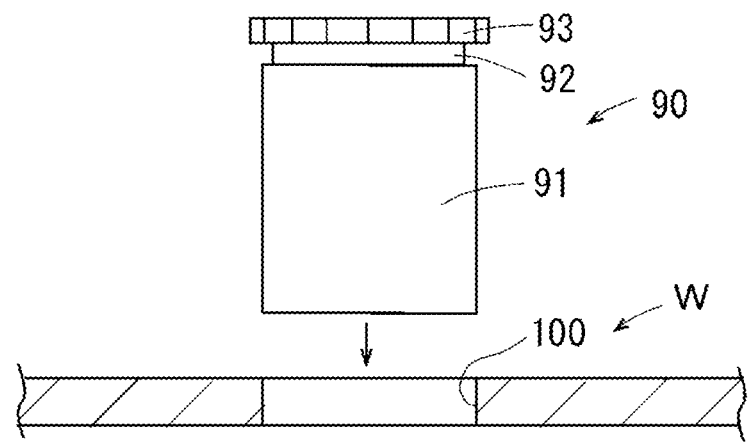
(2)
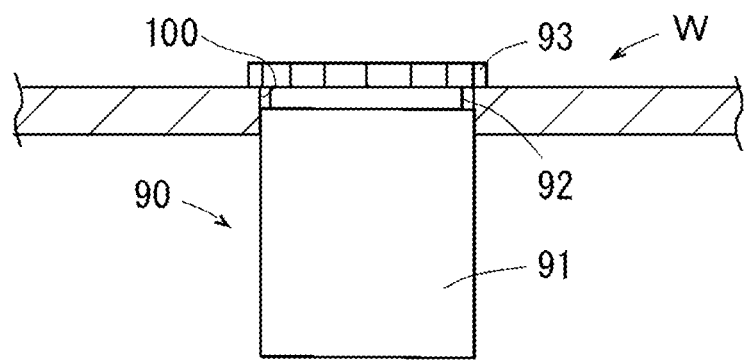
(3)
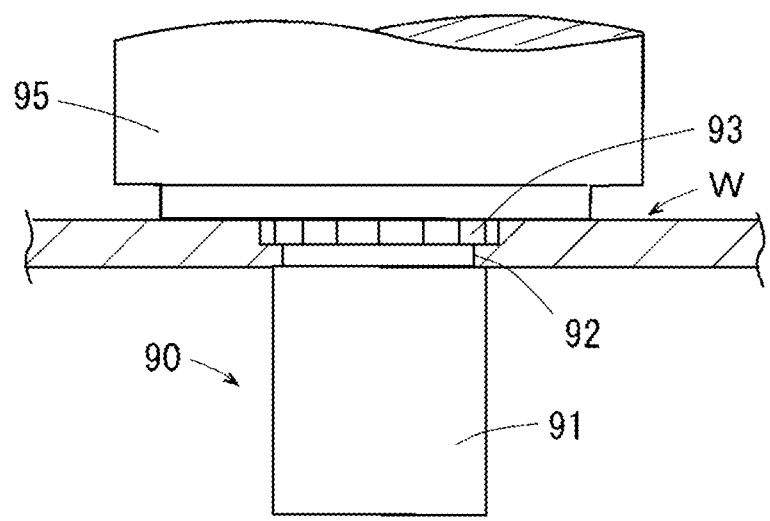

CLINCHING FASTENER PRESS-FITTING METHOD AND FASTENING JIG FOR USE IN THE PRESS-FITTING METHOD

TECHNICAL FIELD

The present invention relates to a clinching fastener press-fitting method for press-fitting a plurality of clinching fasteners into a metal plate, and a fastening jig for use in this method.

BACKGROUND ART

Conventionally, a method through stud welding has been adopted as a method of attaching bolts, nuts, spacers, and the like for mounting electronic components on a metal plate such as a control plate. Stud welding provides high joint strength, but is likely to cause welding defects and positioning defects. Therefore, in recent years, a method of press-fitting a clinching fastener has been adopted to compensate for this drawback. To press-fit a clinching fastener, first, a clinching fastener 90 is inserted into a press-fit hole 100 drilled in a workpiece W, as shown in FIGS. 31 (1) and 31 (2). The clinching fastener 90 consists of a cylindrical body portion 91, a groove portion 92 having a diameter smaller than the diameter of the body portion 91, and a knurl portion 93 having a diameter larger than the diameter of the body portion 91 and also having a knurled outer peripheral surface. The diameter of the press-fit hole 100 is slightly larger than the diameter of the body portion 91. As shown in FIG. 31 (3), when the clinching fastener 90 is press-fitted into the press-fit hole 100 by a punch 95 from an upper part of the knurl portion 93, a part of the workpiece W pushed out under compressive stress by the knurl portion 93 enters the groove portion 92. Thus, the clinching fastener 90 is prevented from coming off, and the knurl portion 93 prevents the clinching fastener 90 from rotating, and thus the clinching fastener 90 is securely fixed to the workpiece W.

As the method of press-fitting the clinching fastener 90 into the workpiece W, a method of using an insertion machine can be adopted. As such an insertion machine, for example, an insertion machine presented in Patent Literature 1 is known.

CITATIONS LIST

Patent Literature

[Patent Literature 1] JP 3181623 U (paragraph [0004] and FIG. 3)

SUMMARY OF INVENTION

Technical Problems

However, the insertion machine can press-fit only one clinching fastener at a time, and, besides, requires a manual work of aligning the press-fit hole of the workpiece with the punch, which is troublesome and time-consuming when press-fitting a plurality of clinching fasteners. There is also a problem when a plurality of types of clinching fasteners are press-fitted into one workpiece. In this case, a method of arranging a plurality of insertion machines and manually transporting the workpiece to a predetermined insertion machine is conceivable. However, this method requires a large number of insertion machines, which requires a high capital investment and a large installation space. Furthermore, since the workpiece is manually transferred among the insertion machines, this method is time-consuming. Additionally, it is difficult to handle large workpieces.

The present invention has been made in view of such conventional problems, and provides a clinching fastener press-fitting method capable of automatically press-fitting a clinching fastener into a workpiece and reducing a manufacturing cost, and a fastening jig for use in the press-fitting method.

Solutions to Problems

In order to solve the above problems, the clinching fastener press-fitting method according to claim 1 is a clinching fastener press-fitting method for press-fitting a plurality of clinching fasteners into a workpiece that is a metal plate, including: a drilling step of drilling press-fit holes at press-fitting positions of the workpiece to press-fit first clinching fasteners that are press-fitted from a punch side of a turret punch press by NC control using the turret punch press; a workpiece mounting step of mounting the workpiece so that the workpiece is superposed on a fastening jig that guides the first clinching fasteners; a fastener insertion step of inserting a predetermined number of the first clinching fasteners taken out from a screw feeder into the press-fit holes of the workpiece mounted on the fastening jig; a fastener press-fitting step of press-fitting the first clinching fasteners into the press-fit holes of the workpiece mounted on the fastening jig by NC control using the turret punch press; and a workpiece removal step of removing the workpiece from the fastening jig.

The clinching fastener press-fitting method according to claim 2 is a clinching fastener press-fitting method for press-fitting a plurality of clinching fasteners into a workpiece that is a metal plate, the clinching fasteners consisting of: first clinching fasteners that are press-fitted from a punch side of a turret punch press; and second clinching fasteners that are press-fitted from a die side of the turret punch press, the method including: a drilling step of drilling press-fit holes at press-fitting positions of the workpiece to press-fit the first and second clinching fasteners by NC control using the turret punch press; a fastener mounting step of mounting a predetermined number of the second clinching fasteners taken out from a screw feeder on mounting portions of a fastening jig that guides the first and second clinching fasteners; a workpiece mounting step of mounting the workpiece so that the workpiece is superposed on the fastening jig; a fastener insertion step of inserting a predetermined number of the first clinching fasteners taken out from the screw feeder into the press-fit holes of the workpiece mounted on the fastening jig; a fastener press-fitting step of press-fitting the first and second clinching fasteners into the press-fit holes of the workpiece mounted on the fastening jig by NC control using the turret punch press; and a workpiece removal step of removing the workpiece from the fastening jig.

The clinching fastener press-fitting method according to claim 3 is a clinching fastener press-fitting method for press-fitting a plurality of clinching fasteners into a workpiece that is a metal plate, including: a drilling step of drilling press-fit holes at press-fitting positions of the workpiece to press-fit second clinching fasteners that are press-fitted from a die side of a turret punch press by NC control using the turret punch press; a fastener mounting step of mounting a predetermined number of the second clinching fasteners taken out from a screw feeder on mounting portions of a fastening jig that guides the second clinching fasteners; a workpiece mounting step of mounting the workpiece so that the workpiece is superposed on the fastening jig; a fastener press-fitting step of press-fitting the second clinching fasteners into the press-fit holes of the workpiece mounted on the fastening jig by NC control using the turret punch press; and a workpiece removal step of removing the workpiece from the fastening jig.

The clinching fastener press-fitting method according to claim 4 is characterized in that the fastening jig is a plate-shaped thick plate of a predetermined thickness, which has drilled therein a guide hole for guiding an outer peripheral portion of each of the first clinching fasteners.

The clinching fastener press-fitting method according to claim 5 is characterized in that the fastening jig is a plate-shaped thick plate of a predetermined thickness, which has drilled therein a guide hole for guiding an outer peripheral portion of each of the first clinching fasteners and is provided with a concave portion and/or convex portion that is the mounting portion on which each of the second clinching fasteners is mounted.

The clinching fastener press-fitting method according to claim 6 is characterized in that the fastening jig is a plate-shaped thick plate of a predetermined thickness, which is provided with a concave portion and/or convex portion that is the mounting portion on which each of the second clinching fasteners is mounted.

The clinching fastener press-fitting method according to claim 7 is characterized in that the fastening jig consists of: a substantially cylindrical chip die of a predetermined axial length, which has drilled therein one or a plurality of guide holes for guiding an outer peripheral portion of each of the first clinching fasteners; and a metal substrate in which the chip die can be mounted at the press-fitting position for each of the first clinching fasteners.

The clinching fastener press-fitting method according to claim 8 is characterized in that the fastening jig consists of: a substantially cylindrical chip die of a predetermined axial length, which has drilled therein one or a plurality of guide holes for guiding an outer peripheral portion of each of the first clinching fasteners; a substantially cylindrical chip die of a predetermined axial length, which is provided with one or a plurality of the mounting portions on which each of the second clinching fasteners is mounted; and a metal substrate in which the respective chip dies can be mounted at the press-fitting positions for the first and second clinching fasteners.

The clinching fastener press-fitting method according to claim 9 is characterized in that the fastening jig consists of: a substantially cylindrical chip die of a predetermined axial length, which is provided with one or a plurality of the mounting portions on which each of the second clinching fasteners is mounted; and a metal substrate in which the respective chip dies can be mounted at the press-fitting positions for the second clinching fasteners.

The clinching fastener press-fitting method according to claim 10 is characterized in that the mounting portion is a concave portion and/or a convex portion provided at an upper end of the column portion.

The clinching fastener press-fitting method according to claim 11 is characterized in that: the chip die includes a cylindrical column portion and a cylindrical fitting portion having a diameter smaller than the diameter of the column portion, which are formed integrally in a stepped shape with their axes aligned, the guide hole is axially drilled through the column portion and the fitting portion, and two or more screw holes having a female screw formed on their inner peripheral surface are axially formed through the column portion outside the diameter of the fitting portion, and the substrate has formed therethrough, a fitting hole into which the fitting portion can be fitted, and mounting holes provided at positions corresponding to the screw holes.

The clinching fastener press-fitting method according to claim 12 is characterized in that: the chip die includes a cylindrical column portion, a ring groove having a diameter smaller than the diameter of the column portion, a fitting portion adjacent to the ring groove and having the same diameter as the diameter of the column portion, and a substrate holding portion adjacent to the fitting portion and having a diameter larger than the diameter of the column portion, which are formed integrally, the substrate has formed therethrough a fitting hole into which the fitting portion can be fitted, and the chip die is fixed to the substrate by fitting the fitting portion into the fitting hole and attaching a snap ring into the ring groove.

The clinching fastener press-fitting method according to claim 13 is characterized in that, in the fastener press-fitting step, a punch having a breakage prevention portion for preventing breakage of the turret punch press is mounted on an upper turret of the turret punch press.

The clinching fastener press-fitting method according to claim 14 is characterized in that the breakage prevention portion is a small diameter portion as a part of the punch whose diameter is reduced.

The fastening jig according to another embodiment is a fastening jig for use in the clinching fastener press-fitting method according to any one of claims 1 to 14.

Advantageous Effects of Invention

In the clinching fastener press-fitting method according to claim 1, in the drilling step, a plurality of press-fit holes are drilled in a workpiece which is a metal plate by NC control using a turret punch press. Further, the workpiece is mounted in such a manner that the workpiece is superposed on the fastening jig in the workpiece mounting step, so that the fastening jig can guide the first clinching fasteners, and the first clinching fasteners are easily inserted into the press-fit holes, in the subsequent fastener insertion step. Further, in the fastener insertion step, only a predetermined number of the first clinching fasteners are taken out from the screw feeder, thereby making it possible to prevent a worker from forgetting to insert the first clinching fasteners into the press-fit holes of the workpiece mounted on the fastening jig.

In the fastener press-fitting step, the first clinching fasteners are press-fitted into the press-fit holes of the workpiece mounted on the fastening jig by NC control using the turret punch press. Thus, it is not necessary to manually align the first clinching fasteners with processing positions, which makes it possible not only to significantly reduce the working time, but also to ensure the safety of the worker. As compared with the case of using a plurality of insertion machines, it is not necessary to manually transfer the workpiece among the insertion machines, and the handling is easy. In addition, a large installation space is unnecessary, and space can be saved. Furthermore, if one already possesses a turret punch press, it is unnecessary to newly introduce an insertion machine, so that the capital investment can be significantly reduced. Therefore, according to this clinching fastener press-fitting method, the clinching fastener can be automatically press-fitted into the workpiece, and the manufacturing cost can be reduced.

According to the clinching fastener press-fitting method according to claim 2, in the drilling step, a plurality of press-fit holes are drilled in a workpiece which is a metal plate by NC control using a turret punch press. Further, in the mounting step, only a predetermined number of the second clinching fasteners are taken out from the screw feeder, thereby making it possible to prevent the worker from forgetting to mount the second clinching fasteners on the mounting portions of the fastening jig. Further, the workpiece is mounted in such a manner that the workpiece is superposed on the fastening jig in the workpiece mounting step, so that the fastening jig can guide the first and second clinching fasteners, and the first clinching fasteners are easily inserted into the press-fit holes, in the subsequent fastener insertion step. Further, in the fastener insertion step, only a predetermined number of the first clinching fasteners are taken out from the screw feeder, thereby making it possible to prevent the worker from forgetting to insert the first clinching fasteners into the press-fit holes of the workpiece mounted on the fastening jig.

In the fastener press-fitting step, the first and second clinching fasteners are press-fitted into the press-fit holes of the workpiece mounted on the fastening jig by NC control using the turret punch press. Thus, it is not necessary to manually align the first and second clinching fasteners with processing positions, which makes it possible not only to significantly reduce the working time, but also to ensure the safety of the worker. As compared with the case of using a plurality of insertion machines, it is not necessary to manually transfer the workpiece among the insertion machines, and the handling is easy. In addition, a large installation space is unnecessary, and space can be saved. Furthermore, if one already possesses a turret punch press, it is unnecessary to newly introduce an insertion machine, so that the capital investment can be significantly reduced. Therefore, according to this clinching fastener press-fitting method, the clinching fastener can be automatically press-fitted into the workpiece, and the manufacturing cost can be reduced.

According to the clinching fastener press-fitting method according to claim 3, in the drilling step, a plurality of press-fit holes are drilled in a workpiece which is a metal plate by NC control using a turret punch press. Further, in the fastener mounting step, only a predetermined number of the second clinching fasteners are taken out from the screw feeder, thereby making it possible to prevent the worker from forgetting to mount the second clinching fasteners on the mounting portions of the fastening jig. Further, since the second clinching fasteners are mounted on the mounting portions of the fastening jig, the second clinching fasteners do not come off even if the fastening jig and the workpiece move at a high speed in the XY-axis directions in the fastener press-fitting step. Further, the workpiece is mounted in such a manner that the workpiece is superposed on the fastening jig in the workpiece mounting step, so that the fastening jig can guide the second clinching fasteners.

In the fastener press-fitting step, the second clinching fasteners are press-fitted into the press-fit holes of the workpiece mounted on the fastening jig by NC control using the turret punch press. Thus, it is not necessary to manually align the second clinching fasteners with processing positions, which makes it possible not only to significantly reduce the working time, but also to ensure the safety of the worker. As compared with the case of using a plurality of insertion machines, it is not necessary to manually transfer the workpiece among the insertion machines, and the handling is easy. In addition, a large installation space is unnecessary, and space can be saved. Furthermore, if one already possesses a turret punch press, it is unnecessary to newly introduce an insertion machine, so that the capital investment can be significantly reduced. Therefore, according to this clinching fastener press-fitting method, the clinching fastener can be automatically press-fitted into the workpiece, and the manufacturing cost can be reduced.

According to the clinching fastener press-fitting method according to claim 4, the fastening jig is a plate-shaped thick plate of a predetermined thickness, which has drilled therein a guide hole for guiding an outer peripheral portion of each of the first clinching fasteners. Therefore, it has a simple structure and also is easy to manufacture, and is particularly suitable when the workpiece is small. The "predetermined thickness" refers to a thickness slightly longer than the length of the longest one among all the first clinching fasteners.

According to the clinching fastener press-fitting method according to claim 5, the fastening jig is a plate-shaped thick plate of a predetermined thickness, which not only has drilled therein a guide hole for guiding an outer peripheral portion of each of the first clinching fasteners, but also is provided with a concave portion and/or convex portion that is the mounting portion on which each of the second clinching fasteners is mounted. Therefore, it has a simple structure and also is easy to manufacture, and is particularly suitable when the workpiece is small. The "predetermined thickness" refers to a thickness slightly longer than the length of the longest one among all the first clinching fasteners.

According to the clinching fastener press-fitting method according to claim 6, the fastening jig is a plate-shaped thick plate of a predetermined thickness, which is provided with a concave portion and/or convex portion that is the mounting portion on which each of the second clinching fasteners is mounted. Therefore, it has a simple structure and also is easy to manufacture, and is particularly suitable when the workpiece is small. The "predetermined thickness" refers to a thickness longer than the length of the longest one among all the second clinching fasteners.

According to the clinching fastener press-fitting method according to claim 7, the fastening jig consists of: a substantially cylindrical chip die having a predetermined axial length; and a metal substrate in which the chip die can be mounted at the press-fitting position for each of the first clinching fasteners. Therefore, the substrate can be made thinner and reduced in weight, and, besides, the substrate and the chip die can be manufactured separately. Further, depending on the degree of density of the press-fitting positions of the first clinching fasteners, one or a plurality of guide holes can be drilled in the chip die, and the diameter of the chip die can be changed accordingly. The "predetermined length" refers to a length slightly longer than the length of the longest one among all the first clinching fasteners.

According to the clinching fastener press-fitting method according to claim 8, the fastening jig consists of: a substantially cylindrical chip die of a predetermined axial length, which has drilled therein a guide hole for guiding an outer peripheral portion of each of the first clinching fasteners; a substantially cylindrical chip die of a predetermined axial length, which is provided with a mounting portion on which each of the second clinching fasteners is mounted; and a metal substrate in which the respective chip dies can be mounted at the press-fitting positions for the first and second clinching fasteners. Therefore, the substrate can be made thinner and reduced in weight, and, besides, the substrate and the chip die can be manufactured separately. Further, depending on the degree of density of the press-fitting positions for the first and second clinching fasteners, one or a plurality of guide holes and mounting portions can be drilled in the chip die, and the diameter of the chip die can be changed accordingly. The "predetermined length" of the chip die for the first clinching fasteners refers to a length slightly longer than the length of the longest one among all the first clinching fasteners. Further, the "predetermined length" of the chip die for the second clinching fasteners is determined from the length of the chip dies for the first clinching fasteners.

According to the clinching fastener press-fitting method according to claim 9, the fastening jig consists of: a substantially cylindrical chip die of a predetermined axial length, which is provided with a mounting portion on which each of the second clinching fasteners is mounted; and a metal substrate in which the respective chip dies can be mounted at the press-fitting positions for the second clinching fasteners. Therefore, the substrate can be made thinner and reduced in weight, and, besides, the substrate and the chip die can be manufactured separately. Further, depending on the degree of density of the press-fitting positions of the second clinching fasteners, one or a plurality of guide holes and mounting portions can be drilled in the chip die, and the diameter of the chip die can be changed accordingly. The "predetermined length" of the chip dies refers to a length longer than the length of the longest one among all the second clinching fasteners.

According to the clinching fastener press-fitting method according to claim 10, the mounting portion is a concave portion and/or a convex portion provided at an upper end of the column portion, thereby making it possible to surely mount the second clinching fasteners on the fastening jig.

According to the clinching fastener press-fitting method according to claim 11, the chip die includes a large-diameter cylindrical column portion and a small-diameter cylindrical fitting portion, which are formed integrally in a stepped shape with their axes aligned; the guide hole is axially drilled through the column portion and the fitting portion; and two or more screw holes having a female screw formed on their inner peripheral surface are axially formed through the column portion outside the diameter of the fitting portion. Further, the substrate has formed therethrough: a fitting hole into which the fitting portion can be fitted; and mounting holes provided at positions corresponding to the screw holes. Therefore, the chip die can be mounted on the substrate by fitting the fitting portion into the fitting hole, and then screwing it with the mounting holes and the screw holes aligned. The fitting hole of the substrate can be drilled at an accurate position by using the turret punch press used in the drilling step and using the drilling position data on the press-fit holes of the workpiece as it is.

According to the clinching fastener press-fitting method according to claim 12, the chip die can be fixed to the substrate by fitting the fitting portion of the chip die into the fitting hole of the substrate and attaching the snap ring into the ring groove. Thus, a fastening jig having a simple structure can be manufactured inexpensively, and, besides, the chip die can be easily mounted on and removed from the substrate.

According to the clinching fastener press-fitting method according to claim 13, in the fastener press-fitting step, a punch having a breakage prevention portion for preventing breakage of the turret punch press is mounted on an upper turret of the turret punch press. Therefore, when a pressure equal to or higher than a predetermined pressure is applied to the punch during press-fitting of the clinching fasteners, the breakage prevention portion can prevent the turret punch press from being broken.

According to the clinching fastener press-fitting method according to claim 14, the breakage prevention portion is a small diameter portion as a part of the punch whose diameter is reduced. Therefore, if a pressure equal to or higher than a predetermined pressure is applied to the punch during press-fitting of the clinching fasteners, the punch itself is broken at the small diameter portion.

The fastening jig according to another embodiment is used in the clinching fastener press-fitting method described above. Thus, it is possible to automatically press-fit the first and second clinching fasteners into the workpiece, and to reduce the manufacturing cost.

BRIEF DESCRIPTION OF DRAWINGS

FIG. 1 is a schematic diagram of an apparatus according to a clinching fastener press-fitting method of Embodiment 1.

FIG. 5 includes a plan view and a front view of a fastening jig according to the clinching fastener press-fitting method of Embodiment 1.

FIG. 16 is a schematic diagram of an apparatus according to a clinching fastener press-fitting method of Embodiment 2.

FIG. 31 is a schematic diagram showing a state in which the clinching fastener is press-fitted into the workpiece.

DESCRIPTION OF EMBODIMENTS

Figure 2:
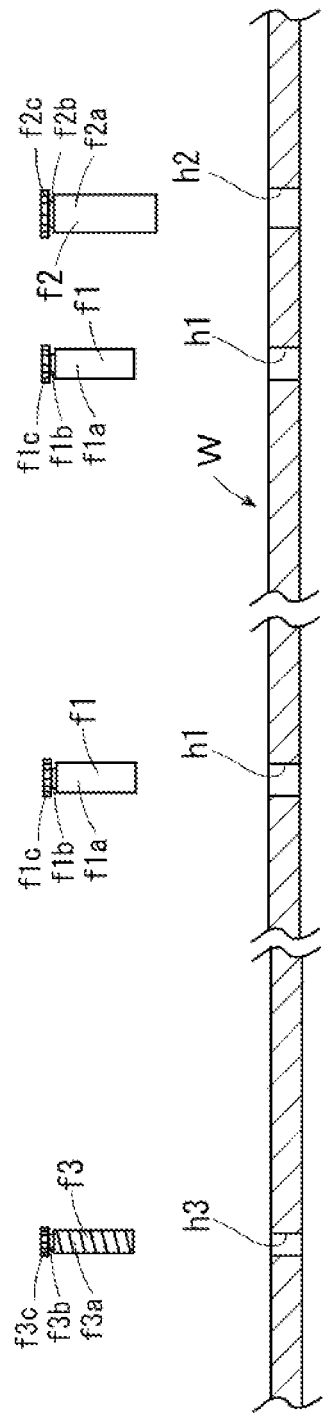
FIG. 2 is a partially enlarged cross-sectional view of clinching fasteners and a workpiece before press-fitting of the clinching fasteners according to the clinching fastener press-fitting method of Embodiment 1.

Embodiments 1 to 3 embodying the clinching fastener press-fitting method according to the present invention will be described below with reference to the drawings. FIG. 1 is a schematic diagram showing an outline of an apparatus used in a clinching fastener press-fitting method of Embodiment 1. This apparatus has a turret punch press 80, a first workbench 1, and a second workbench 2. The turret punch press 80 includes an upper turret 81 to which a plurality of punches 83 are mounted, a lower turret 82 to which dies 85 corresponding to the punches 83 are mounted via die holders 84, and a clamp 86 for gripping a workpiece W. The workpiece W is a rectangular metal plate. In this apparatus, the upper turret 81 and the lower turret 82 are rotated by NC control to set predetermined punch 83 and die 85 at a processing position, and the workpiece W is controlled in the XY-axis directions to position its place to be processed at the processing position. The punch 83 and the die 85 are controlled in the Z-axis direction to perform a predetermined punching process. This turret punch press 80 serves both to drill a press-fit hole in the workpiece W and to press-fit the clinching fastener into the workpiece W. However, when the clinching fastener is press-fitted into the workpiece W, a punch 7 and a die 8 are used instead of the punch 83 and the die 85 (see FIGS. 10 and 14).

Screw feeders 3, 4, and 5 are installed on the first workbench 1 for each type of clinching fasteners. The screw feeders 3, 4, and 5 each feed a predetermined number of clinching fasteners housed therein, and three types of clinching fasteners are used. The first workbench 1 is used when the workpiece W is mounted on the fastening jig 6 and the clinching fasteners are inserted into the workpiece W. The fastening jig 6 assists in surely press-fitting the clinching fasteners into the workpiece W when the clinching fasteners are press-fitted into the workpiece W by NC control. The second workbench 2 is used when the worker removes the workpiece W from the fastening jig 6. In Embodiment 1, for convenience of explanation, three types of clinching fasteners and three screw feeders 3, 4, and 5 are used, but four or more types of clinching fasteners and four or more screw feeders may be used. Further, although one workpiece W is mounted on the fastening jig 6, two or more workpieces Ws may be mounted. Further, in consideration of work efficiency, a plurality of first workbenches 1 may be prepared for coordination with a processing speed of the turret punch press 80. Further, one workbench may be used as both the first workbench 1 and the second workbench 2.

FIG. 2 is a partially enlarged sectional view of first clinching fasteners f1, f2, and f3 that are press-fitted from the punch 7 side of the turret punch press 80, and a workpiece W having drilled therein press-fit holes h1, h2, and h3 into which the first clinching fasteners f1, f2, and f3 are press-fitted. The press-fit holes h1, h2, and h3 are drilled by NC control using the turret punch press 80. The first clinching fastener f1 is an M3 spacer, the first clinching fastener f2 is an M4 spacer, and the first clinching fastener f3 is an M3 bolt. These first clinching fasteners f1, f2, and f3 are housed in the screw feeders 3, 4, and 5, respectively. Here, the first clinching fasteners f1 and f2 consist of cylindrical body portions f1a and f2a each provided with a female screw in the axial direction, and groove portions f1b and f2b and knurl portions f1c and f2c formed at one end of the body portions f1a and f2a, respectively. Further, the first clinching fastener f3 consists of a cylindrical body portion f3a provided with a male screw on its outer periphery, and a groove portion f3b and a knurl portion f3c formed at one end of the body portion f3a.

Figure 3:
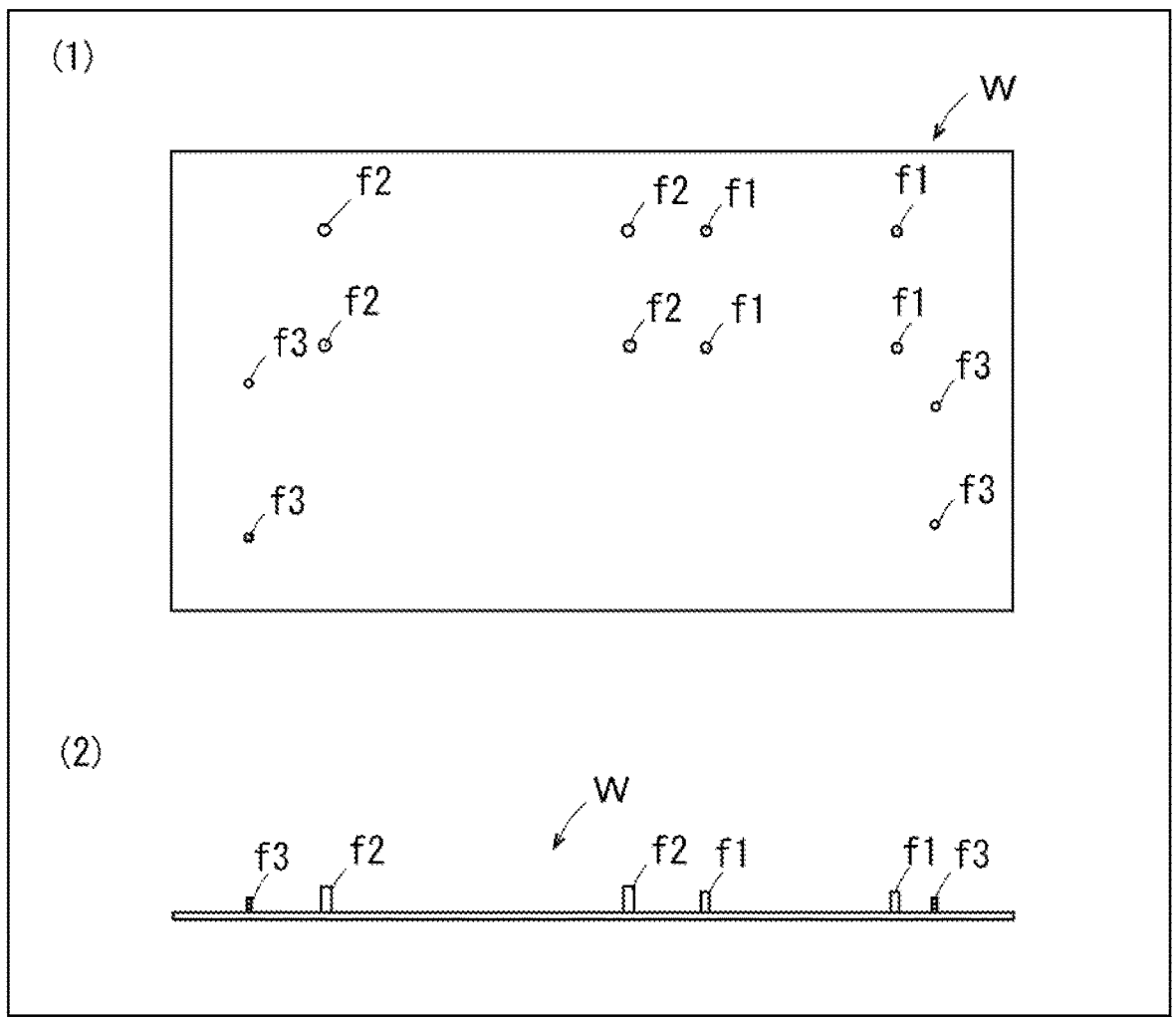
FIG. 3 includes a plan view and a front view of the workpiece after press-fitting of the clinching fasteners according to the clinching fastener press-fitting method of Embodiment 1.

FIG. 3 includes a plan view and a front view of the workpiece W into which the first clinching fasteners f1, f2, and f3 are press-fitted. A printed circuit board is mounted on the first clinching fasteners f1 and f2, and a connector is mounted on the first clinching fastener f3. For convenience of explanation, a workpiece W into which a relatively small number of the first clinching fasteners f1, f2, and f3 are press-fitted is adopted. The workpiece W shown in FIG. 3 is the workpiece W as a finished product by this clinching fastener press-fitting method.

Figure 4:
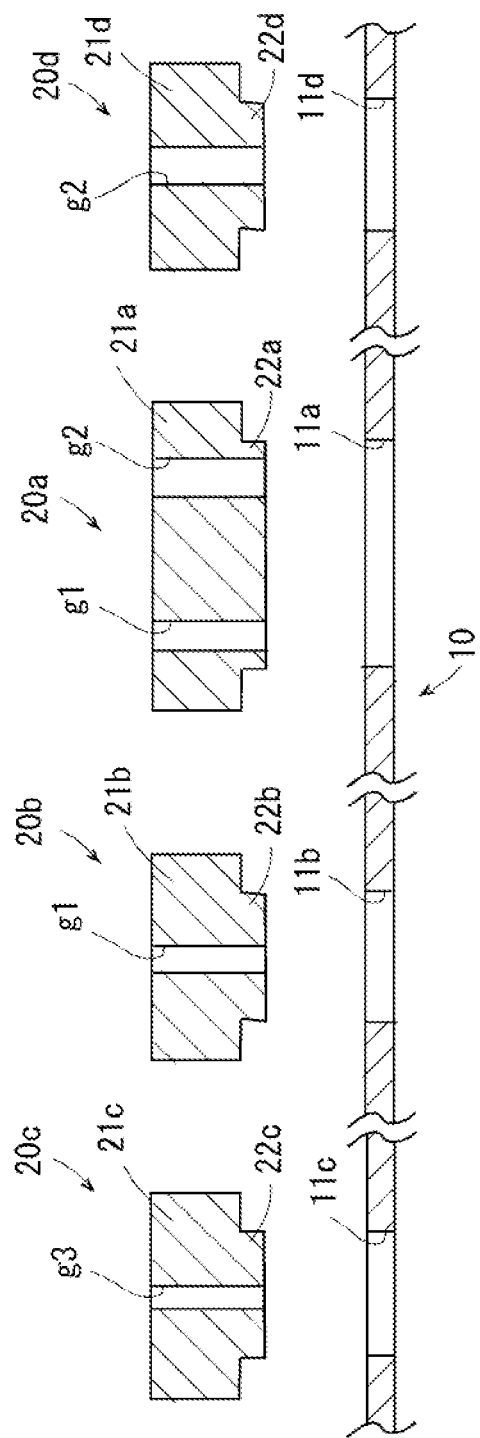
FIG. 4 is a partially enlarged cross-sectional view of chip dies and a substrate before assembling according to the clinching fastener press-fitting method of Embodiment 1.

FIG. 4 is a partially enlarged cross-sectional view of four types of chip dies 20a, 20b, 20c, and 20d and a substrate 10 constituting the fastening jig 6. The chip dies 20a, 20b, 20c, and 20d have cylindrical column portions 21a, 21b, 21c, and 21d and cylindrical fitting portions 22a, 22b, 22c, and 22d which have a diameter smaller than the diameter of the column portions 21a, 21b, 21c, and 21d, respectively, which are formed integrally. Their axial length is slightly longer than the length of the longest one among the first clinching fasteners f1, f2, and f3. Then, guide holes g1, g2, and g3 that guide the first clinching fasteners f1, f2, and f3 are drilled through the column portions 21a, 21b, 21c, and 21d and the fitting portions 22a, 22b, 22c, and 22d. The chip die 20a has the guide holes g1 and g2 drilled therein, and is intended for the first clinching fasteners f1 and f2, and the chip die 20b has the guide hole g1 drilled therein, and is intended for the first clinching fastener f1. The chip die 20c has the guide hole g3 drilled for the first clinching fastener f3, and the chip die 20d has the guide hole g2 drilled for the first clinching fastener f2. The chip dies 20b, the chip die 20c, and the chip die 20d have the same outer shape, and the chip die 20a has a larger diameter than those of the chip dies 20b, 20c, and 20d.

The substrate 10 is made of a metal having substantially the same shape and thickness as those of the workpiece W, and has formed therethrough fitting holes 11a, 11b, 11c, and 11d into which the fitting portions 22a, 22b, 22c, and 22d of the chip dies 20a, 20b, 20c, and 20d are fitted. When the fitting portions 22a, 22b, 22c, and 22d are fitted into the fitting holes 11a, 11b, 11c, and 11d to mount the chip dies 20a, 20b, 20c, and 20d on the substrate 10, the fastening jig 6 shown in FIG. 5 is obtained. In addition to the chip dies 20a, 20b, 20c, and 20d disposed at predetermined positions, the fastening jig 6 has alignment pins 25 for use in aligning the workpiece W, which are disposed at three locations. The center positions of the guide holes g1, g2, and g3 completely coincide with the center positions of the press-fit holes h1, h2, and h3 of the workpiece W. Therefore, if the fitting holes 11a, 11b, 11c, and 11d are drilled by the turret punch press 80 using the data on the press-fit holes h1, h2, and h3 of the workpiece W, the fitting holes 11a, 11b, 11c, and 11d can be formed in the substrate 10 with high accuracy.

Figure 6:
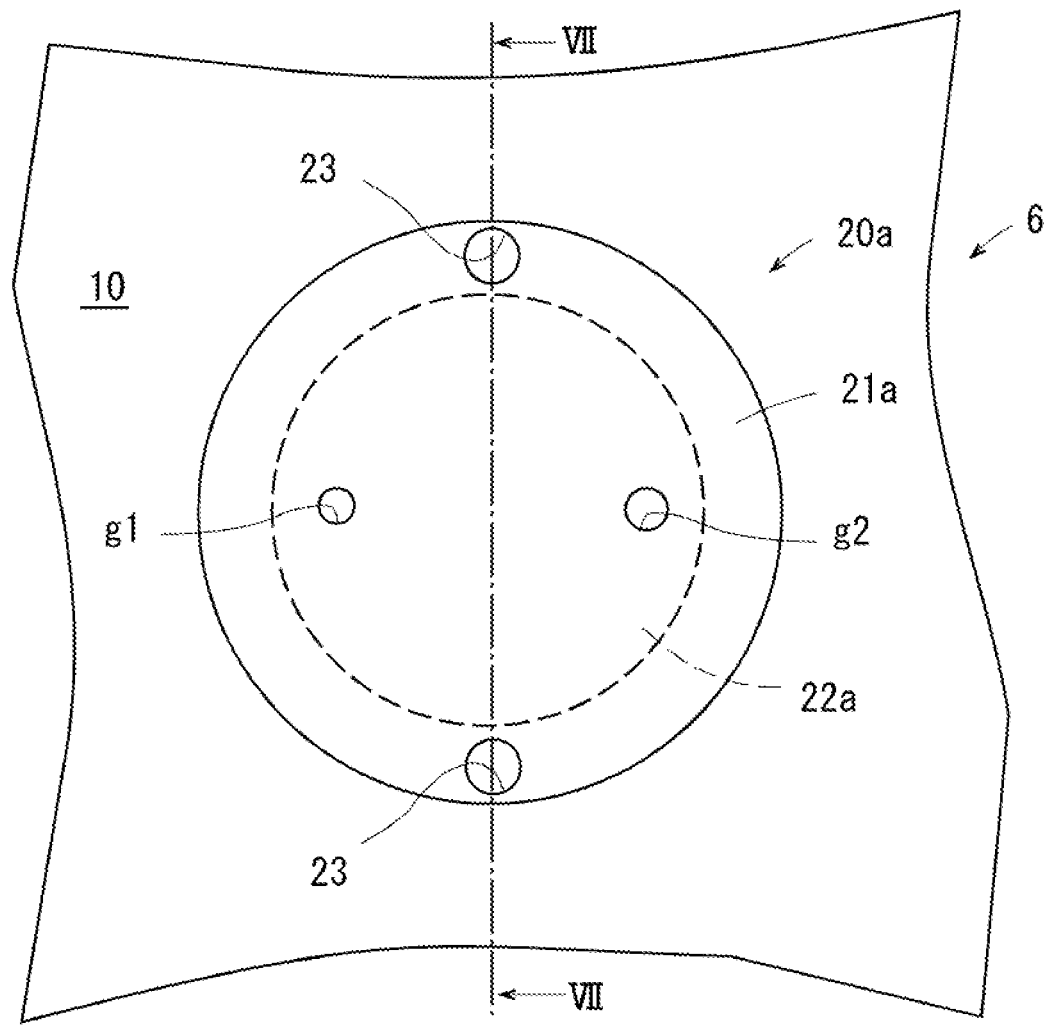
FIG. 6 is a partially enlarged plan view of the fastening jig according to the clinching fastener press-fitting method of Embodiment 1.
Figure 7:
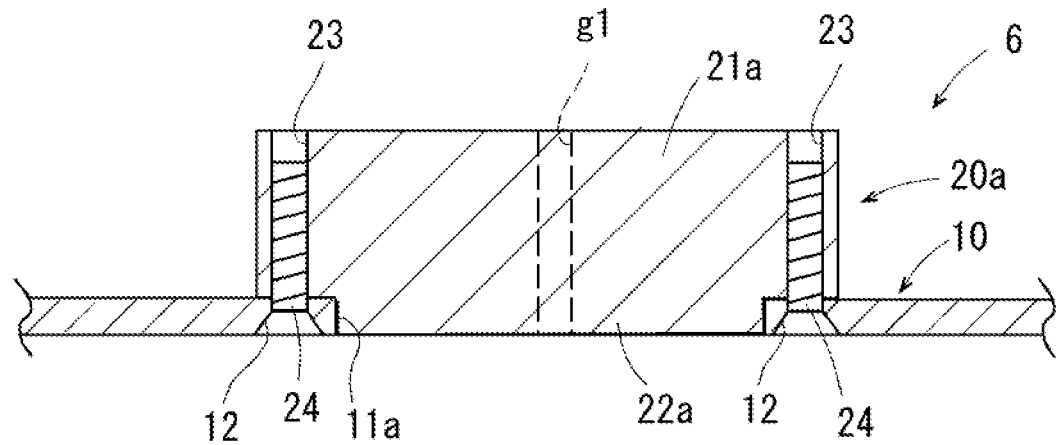
FIG. 7 is a cross-sectional view taken along a line VII-VII in FIG. 6 according to the clinching fastener press-fitting method of Embodiment 1.

Next, a method of mounting the chip die 20a on the substrate 10 will be described with reference to FIGS. 6 and 7. As shown in FIGS. 6 and 7, two screw holes 23 having a female screw formed on its inner peripheral surface are axially formed through the column portion 21a outside the diameter of the fitting portion 22a of the chip die 20a. Mounting holes 12 are formed through the substrate 10 at positions corresponding to the screw holes 23. The fitting portion 22a of the chip die 20a is fitted into the fitting hole 11a of the substrate 10, and mounting screws 24, which are male screws, are inserted into the mounting holes 12 and the screw holes 23 and tightened, so that the chip die 20a is mounted on the substrate 10. The same applies to the chip dies 20b, 20c and 20d, and all the chip dies 20a, 20b, 20c and 20d are mounted on the substrate 10 to complete the fastening jig 6.

Figure 8:
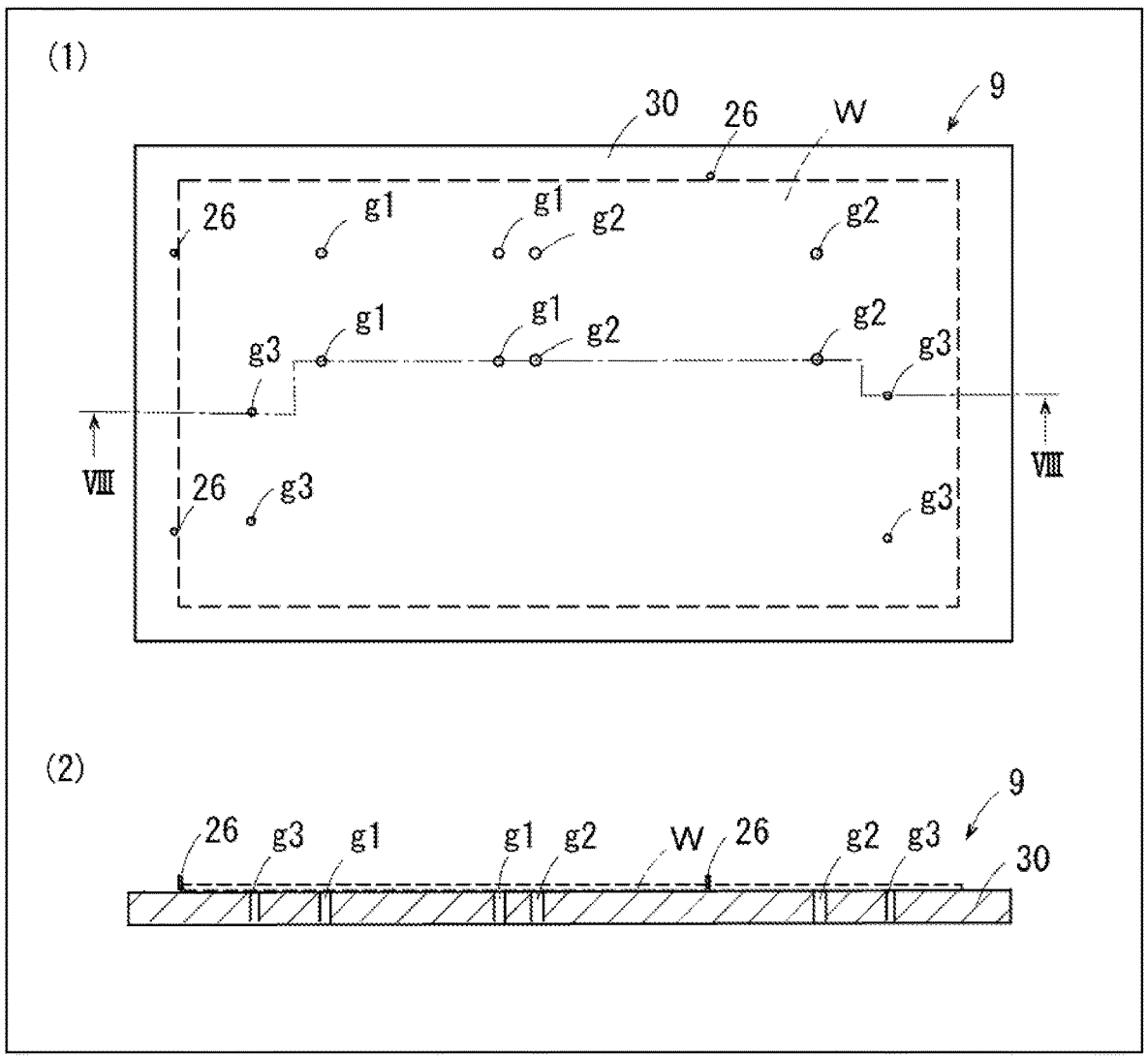
FIG. 8 includes a plan view of another fastening jig according to the clinching fastener press-fitting method of Embodiment 1, and a cross-sectional view taken along a line XIII-XIII in FIG. 8 (1).

A fastening jig 9 shown in FIG. 8 can also be used instead of the fastening jig 6. However, FIG. 8 (1) is a plan view of the fastening jig 9. Further, FIG. 8 (2) is a cross-sectional view taken along the line XIII-XIII in FIG. 8 (1). This fastening jig 9 is a thick plate 30 having a thickness slightly longer than the length of the longest one among the first clinching fasteners f1, f2, and f3. The thick plate 30 has directly drilled therein the guide holes g1, g2, and g3 that guide the first clinching fasteners f1, f2, and f3. The fastening jig 9 has alignment pins 26 for use in aligning the workpiece W, which are disposed at three locations.

Figure 9:
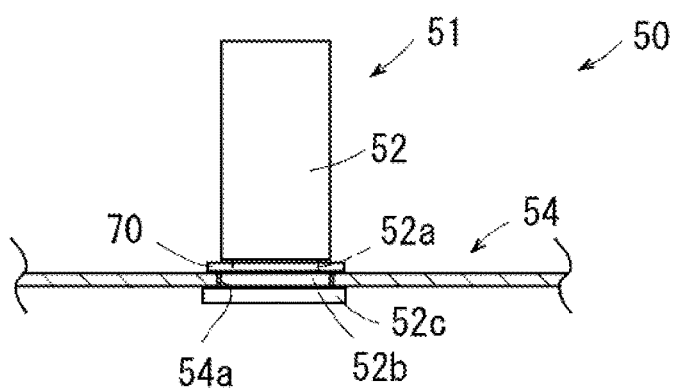
FIG. 9 includes partially enlarged cross-sectional views of still another fastening jig before and after assembling according to the clinching fastener press-fitting method of Embodiment 1.

Further, instead of the fastening jig 6, a fastening jig 50 shown in FIG. 9 (2) can also be used. Here, FIGS. 9 (1) and 9 (2) are partially enlarged cross-sectional views of the fastening jig 50 before and after assembling. While many chip dies are actually assembled on the substrate 54, only one chip die 51 will be described. As shown in FIG. 9 (1), the fastening jig 50 is composed of the chip die 51, the substrate 54, and a snap ring 70. The chip die 51 includes a cylindrical column portion 52, a ring groove 52a, a fitting portion 52b, and a substrate holding portion 52c which are formed integrally. The ring groove 52a is a groove for attaching the snap ring 70. The fitting portion 52b has the same outer diameter as that of the column portion 52, and its axial length is substantially the same as the thickness of the substrate 54. The substrate holding portion 52c has an outer diameter slightly larger than the outer diameter of the column portion 52, holds the substrate 54 together with the snap ring 70 with the substrate 54 being sandwiched between the substrate holding portion 52c and the snap ring 70, and serves to fix the chip die 51 to the substrate 54. The guide hole g1 for the first clinching fastener f1 is axially formed through the center of the column portion 52, the ring groove 52a, the fitting portion 52b, and the substrate holding portion 52c. If the guide holes g2 and 3 are provided instead of the guide holes g1, the chip die for the first clinching fasteners f2 and 3 is obtained. Further, the substrate 54 is made of a metal having substantially the same shape as that of the workpiece W, and has formed therethrough a fitting hole 54a into which the fitting portion 52b can be fitted. The snap ring 70 includes an E-shaped retaining ring and a C-shaped retaining ring.

To assemble this fastening jig 50, the chip die 51 is fitted into the fitting hole 54a of the substrate 54 from the column portion 52, and the fitting portion 52b is fitted into the fitting hole 54a. The chip die 51 is mounted on and fixed to the substrate 54 by fitting the snap ring 70 into the ring groove 52a for attachment. As a result, the fastening jig 50 shown in FIG. 9 (2) is assembled.

Figure 10:
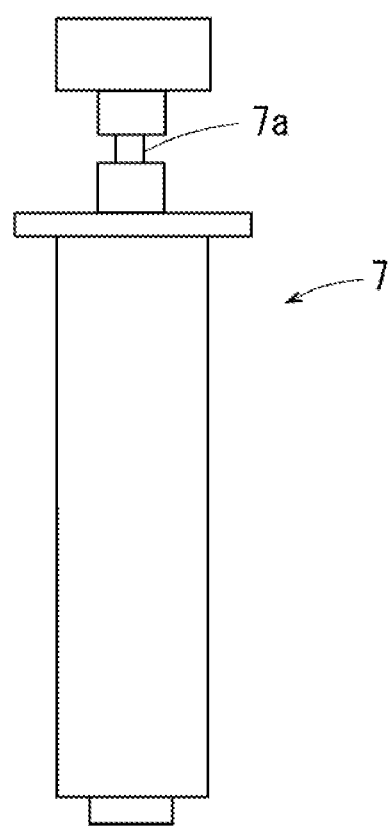
FIG. 10 is a front view of a punch according to clinching fastener press-fitting methods of Embodiments 1 and 2.

FIG. 10 is a front view of the punch 7. This punch 7 is used when the first clinching fasteners f1, f2, and f3 are press-fitted into the workpiece W. That is, before the first clinching fasteners f1, f2, and f3 are press-fitted into the workpiece W, the punch 7 is mounted instead of the punch 83 mounted on the upper turret 81 shown in FIG. 1, and the die 8 is mounted instead of the die 84 mounted on the lower turret 82 (see FIG. 14). The punch 7 is formed with a small diameter portion 7a whose diameter is reduced, as the breakage prevention portion. When a pressure equal to or higher than a predetermined pressure is applied to the punch 7, the punch 7 breaks at the small diameter portion 7a to prevent breakage of the turret punch press 80.

Figure 11:
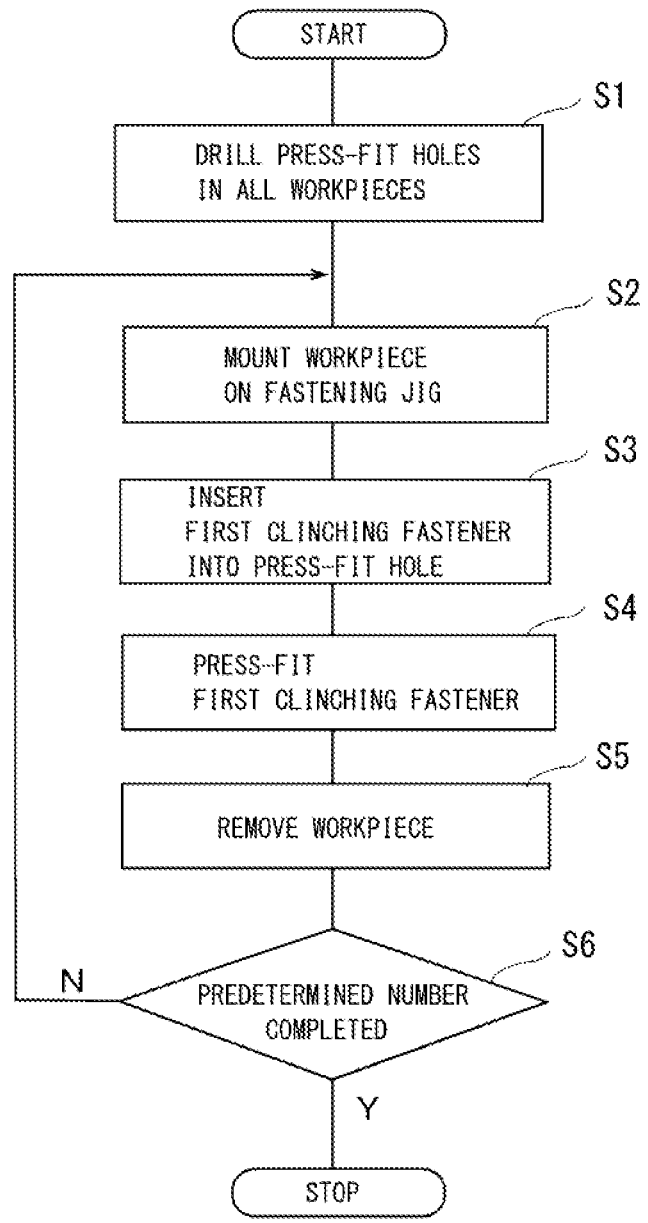
FIG. 11 is a flowchart of the clinching fastener press-fitting method according to Embodiment 1.

Next, this clinching fastener press-fitting method will be described with reference to the flowchart shown in FIG. 11. First, in step S1, the press-fit holes h1, h2, and h3 are drilled for all the workpieces Ws using a turret punch press 80. Specifically, according to a program, predetermined punch 83 and die 85 are set at a processing position, and the workpiece W is controlled in the XY-axis directions to position its place for drilling at the processing position. The punch 83 and the die 85 are then controlled in the Z-axis direction to drill predetermined press-fit holes h1, h2, and h3. This operation is repeated to drill all the press-fit holes h1, h2, and h3 in one workpiece W, and the same operation is repeated for all the workpieces Ws, and the drilling of the press-fit holes h1, h2, and h3 in all the workpieces Ws is completed. Step S1 is a drilling step. Since this workpiece W is used as it is in the subsequent steps, especially in a fastener press-fitting step S4, the first clinching fasteners f1, f2, and f3 can be surely fixed to the workpiece W, by controlling the thickness of the workpiece W before the drilling step.

Figure 12:
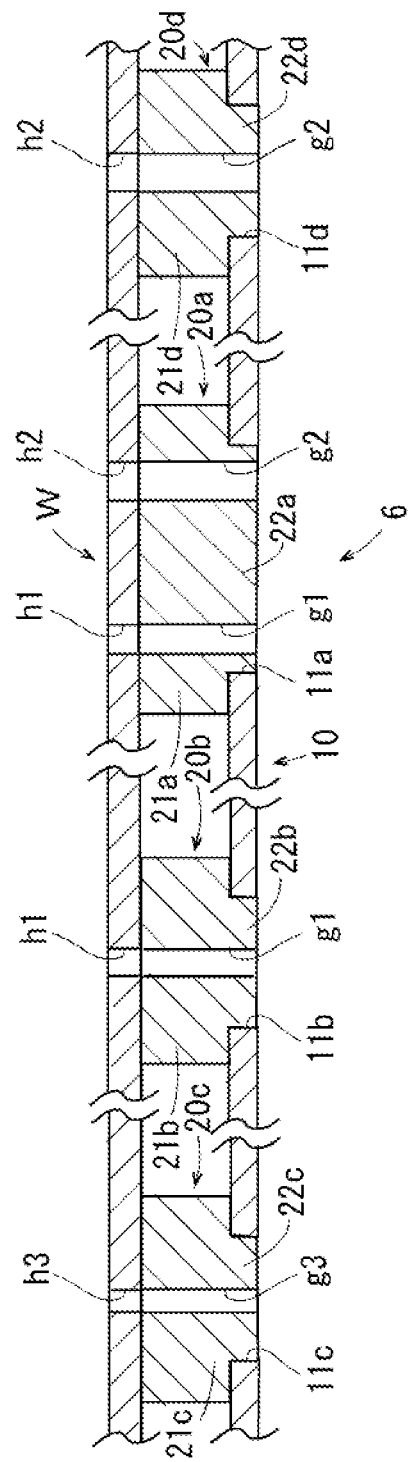
FIG. 12 is a partially enlarged cross-sectional view of a state in which the workpiece is mounted on the fastening jig according to the clinching fastener press-fitting method of Embodiment 1.

In step S2, as shown in FIG. 12, the workpiece W having the press-fit holes h1, h2, and h3 drilled therein is mounted on the fastening jig 6 on the first workbench 1. The alignment pins 25 are mounted at three positions of the substrate 10, and the workpiece W is aligned with the alignment pins 25, so that the press-fit holes h1, h2, and h3 of the workpiece W and the guide holes g1, g2, and g3 of the chip dies 20a, 20b, 20c, and 20d are exactly aligned with each other. Step S2 is a workpiece mounting step.

Figure 13:
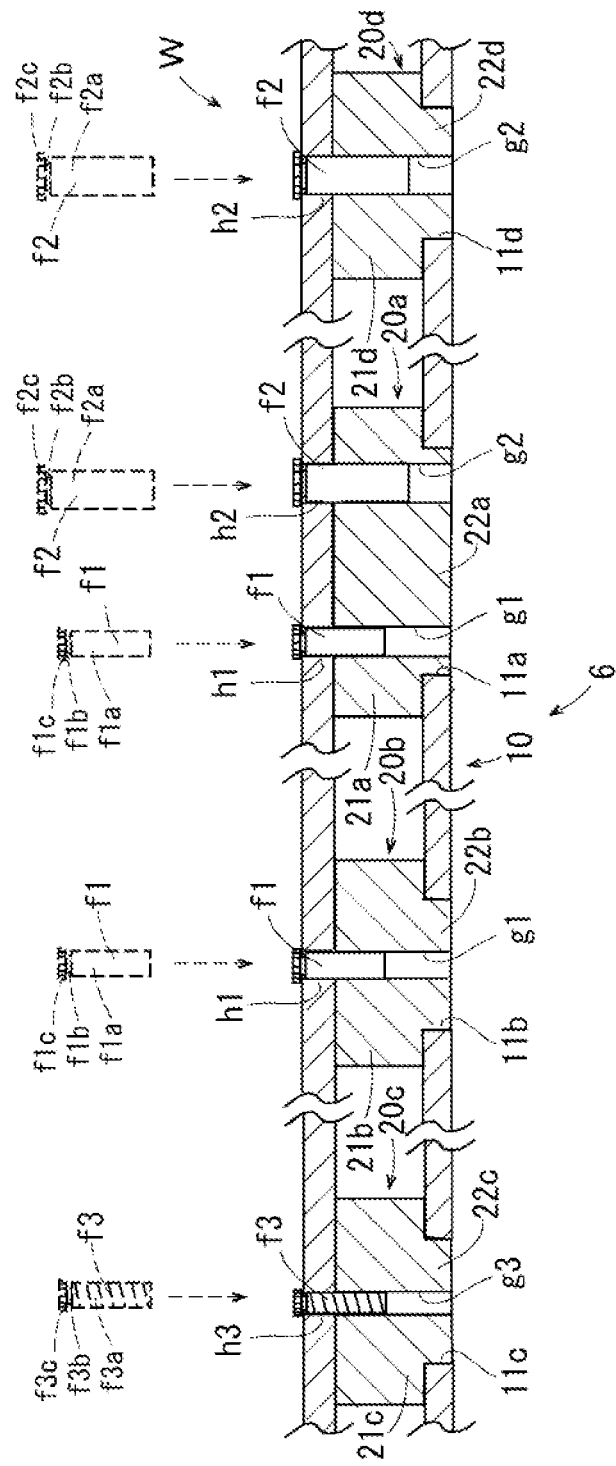
FIG. 13 is a partially enlarged cross-sectional view of a state in which the clinching fasteners are inserted into the workpiece according to the clinching fastener press-fitting method of Embodiment 1.

In step S3, as shown in FIG. 13, on the first workbench 1, the first clinching fasteners f1, f2, and f3 are mounted to the press-fit holes h1, h2, and h3 of the workpiece W and the guide holes g1, g2, and g3 of the chip dies 20a, 20b, 20c, and 20d. First, a predetermined number of the first clinching fasteners f1 are fed from the screw feeder 3, and all the first clinching fasteners f1 are inserted into all the press-fit holes h1 (guide holes g1) of the workpiece W. As a result, the body portions f1a and the groove portions fib of the first clinching fasteners f1 are inserted into the press-fit holes h1 and the guide holes g1. Similarly, a predetermined number of the first clinching fasteners f2 and f3 are fed from the screw feeders 4 and 5, and all the first clinching fasteners f2 and f3 are inserted into all the press-fit holes h2 and h3 (guide holes g2 and g3) of the workpiece W. As a result, the body portions f2a and f3a and the groove portions f2b and f3b of the first clinching fasteners f2 and f3 are inserted into the press-fit holes h2 and h3 and the guide holes g2 and g3. Since the press-fit holes h1, h2, and h3 of the workpiece W and the guide holes g1, g2, and g3 of the chip dies 20a, 20b, 20c, and 20d of the fastening jig 6 are exactly aligned with each other, the first clinching fasteners f1, f2, and f3 can be surely placed perpendicularly to the surface of the workpiece W. If not all the first clinching fasteners f1, f2, and f3 have been inserted into all the press-fit holes h1, h2, and h3 of the workpiece W, the first clinching fasteners f1, f2, and f3 become excessive or deficient. So, it is easy to check for excess or deficiency. Step S3 is a fastener insertion step.

Figure 14:
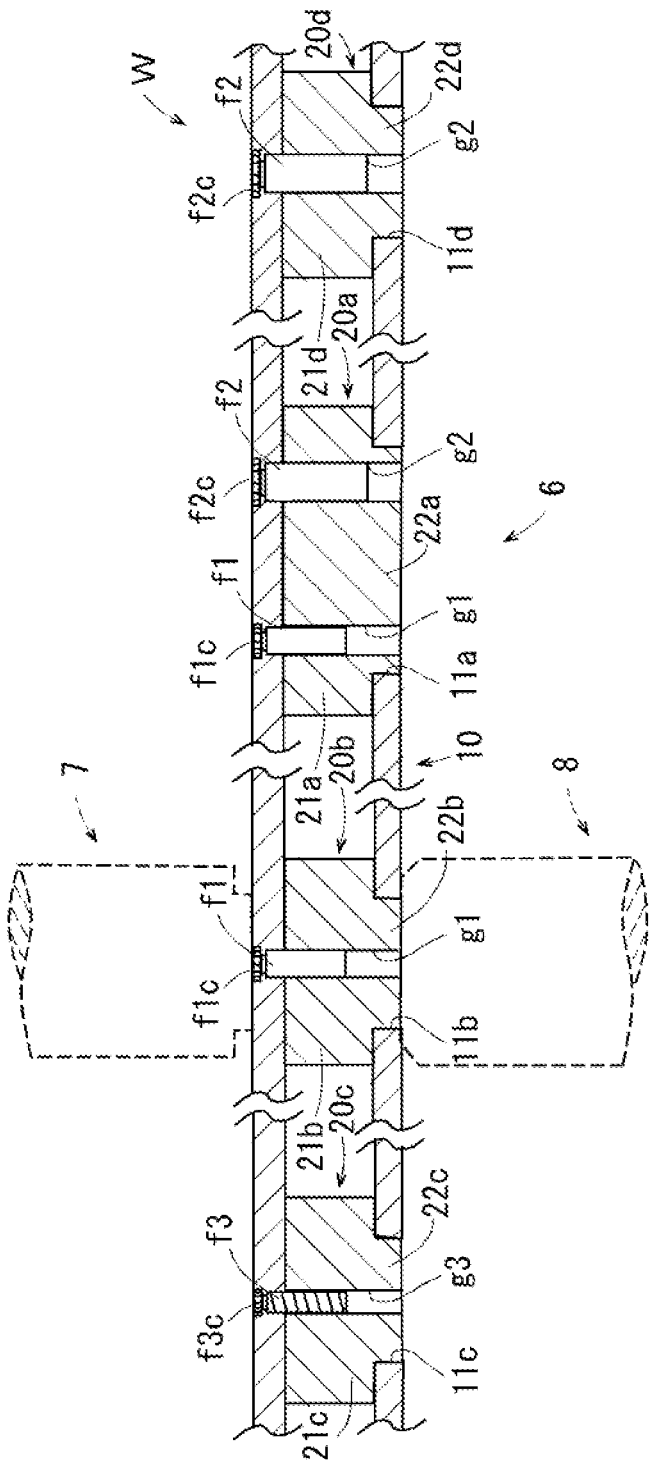
FIG. 14 is a partially enlarged cross-sectional view of a state in which the clinching fasteners are press-fitted into the workpiece according to the clinching fastener press-fitting method of Embodiment 1.

In step S4, as shown in FIG. 14, the knurl portions f1c, f2c, and f3c of all the first clinching fasteners f1, f2, and f3 are press-fitted into the press-fit holes h1, h2, and h3 of the workpiece W mounted on the fastening jig 6 by NC control using the turret punch press 80. However, before step S4 is performed, the punch 7 is mounted in place of the punch 83 mounted on the upper turret 81 shown in FIG. 1, and the die 8 is mounted in place of the die 85 mounted on the lower turret 82. The tips of the punch 7 and the die 8 are flattened. When step S4 is performed, the upper turret 81 and the lower turret 82 are rotated according to the program to determine the predetermined punch 7 and die 8 at the processing position, and the workpiece W is controlled in the XY-axis directions, so that the predetermined press-fit holes h1, h2, and h3 are positioned at the processing positions. The punch 7 and the die 8 are then controlled in the Z-axis direction, and the first clinching fasteners f1, f2, and f3 are press-fitted into the press-fit holes h1, h2, and h3 of the workpiece W. This is repeated for all the first clinching fasteners f1, f2, and f3, and the press-fitting of the first clinching fasteners f1, f2, and f3 into the press-fit holes h1, h2, and h3 of the workpiece W is completed. In this way, the first clinching fasteners f1, f2, and f3 are press-fitted into the press-fit holes h1, h2, and h3 of the workpiece W by NC control, and thus it is not necessary to manually align the first clinching fasteners f1, f2, and f3 with the processing positions, which makes it possible not only to significantly reduce the workpiece time, but also to ensure the safety of the worker. Step S4 is a fastener press-fitting step. Depending on the types of the first clinching fasteners f1, f2, and f3, the descending speed of the punch 7 and the stop time (pressurization time) at the bottom dead center are changed and controlled.

Figure 15:
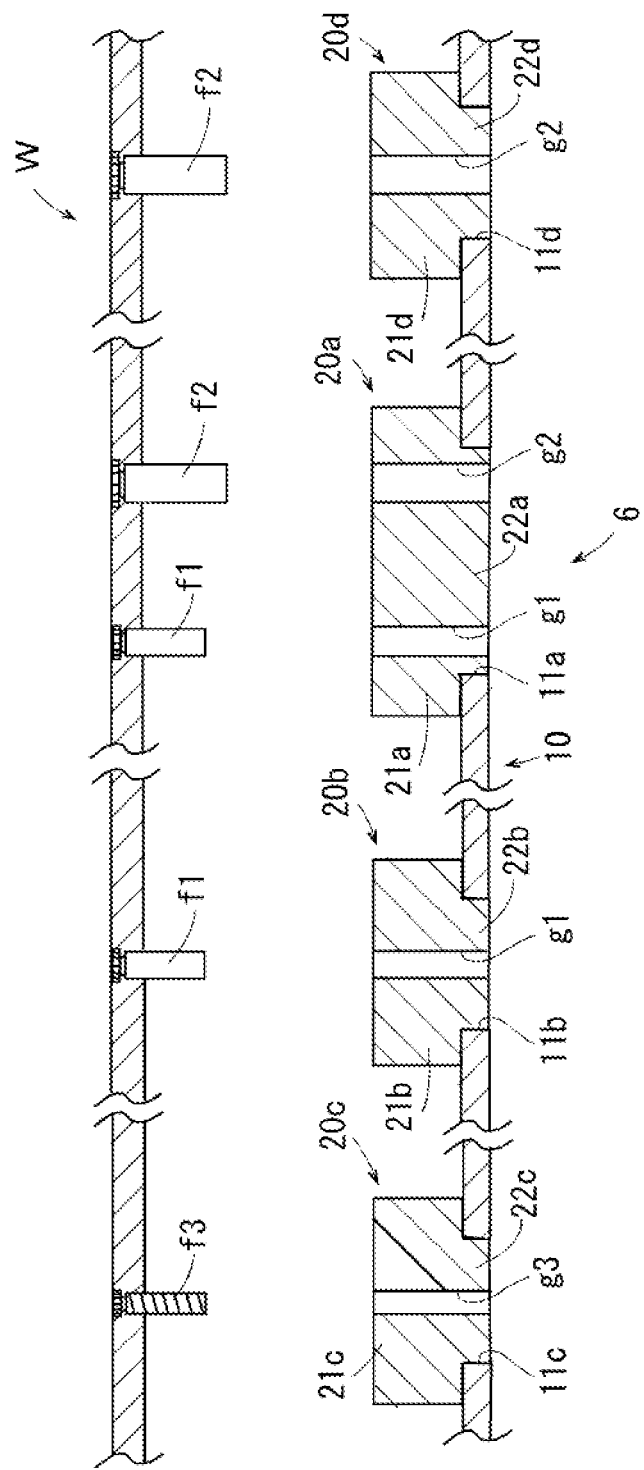
FIG. 15 is a partially enlarged cross-sectional view of a state in which the workpiece is removed from the fastening jig according to the clinching fastener press-fitting method of Embodiment 1.

In step S5, as shown in FIG. 15, the workpiece W is removed from the fastening jig 6 on the second workbench 2. As a result, a finished product is completed, which is one workpiece W into which the first clinching fasteners f1, f2, and f3 are press-fitted as shown in FIGS. 3 (1) and 3 (2). However, the workpiece W in FIGS. 3 (1) and 3 (2) is a workpiece in which the upper surface and the lower surface are inverted by laterally inverting the workpiece W in FIG. 15. Step S5 is a workpiece removal step.

In step S6, if the press-fitting of the first clinching fasteners f1, f2, and f3 has not been completed for a predetermined number of workpieces Ws (N), the steps are performed from step S2 for the next workpiece W. Further, when the press-fitting of the first clinching fasteners f1, f2, and f3 has been completed for a predetermined number of workpieces Ws (Y), the work is completed.

In the clinching fastener press-fitting method of Embodiment 1, in the drilling step S1, the plurality of press-fit holes h1, h2, and h3 are drilled in the workpiece W which is a metal plate by NC control using the turret punch press 80. Further, the workpiece W is mounted in such a manner that the workpiece W is superposed on the fastening jig 6 in the workpiece mounting step S2, so that the fastening jig 6 can guide the first clinching fasteners f1, f2, and f3, and the first clinching fasteners f1, f2, and f3 are easily inserted into the press-fit holes h1, h2, and h3, in the subsequent fastener insertion step S3. Further, in the fastener insertion step S3, a predetermined number of the first clinching fasteners f1, f2, and f3 are taken out from the screw feeders 3, 4, and 5, thereby making it possible to prevent the worker from forgetting to insert the first clinching fasteners f1, f2, and f3 into the press-fit holes h1, h2, and h3 of the workpiece W.

In the fastener press-fitting step S4, the first clinching fasteners f1, f2, and f3 are press-fitted into the press-fit holes h1, h2, and h3 of the workpiece W by NC control using the turret punch press 80. Thus, it is not necessary to manually align the first clinching fasteners f1, f2, and f3 with the processing positions, which makes it possible not only to significantly reduce the working time, but also to ensure the safety of the worker. As compared with the case of using a plurality of insertion machines, it is not necessary to manually transfer the workpiece among the insertion machines, and the handling is easy. In addition, a large installation space is unnecessary, and space can be saved. Furthermore, if one already possesses the turret punch press 80, it is unnecessary to newly introduce an insertion machine, so that the capital investment can be significantly reduced. Therefore, according to this clinching fastener press-fitting method, the first clinching fasteners f1, f2, and f3 can be automatically press-fitted into the workpiece W, and the manufacturing cost can be reduced.

According to the clinching fastener press-fitting method, the fastening jig 6 consists of: the substantially cylindrical chip dies 20a, 20b, 20c, and 20d having a predetermined axial length; and the metal substrate 10 in which the chip dies 20a, 20b, 20c, and 20d can be mounted at press-fitting positions of the first clinching fasteners f1, f2, and f3. Therefore, the substrate 10 can be made thinner and reduced in weight, and, besides, the substrate 10 and the chip dies 20a, 20b, 20c, and 20d can be manufactured separately. In addition, depending on the density of the press-fitting positions of the first clinching fasteners f1, f2, and f3, a new chip die can be manufactured and a plurality of guide holes g1, g2, and g3 can be drilled. The diameter of the new chip die can be changed accordingly.

Further, according to this clinching fastener press-fitting method, the chip dies 20a, 20b, 20c, and 20d include the large-diameter column portions 21a, 21b, 21c, and 21d and the small-diameter cylindrical fitting portions 22a, 22b, 22c, and 22d, which are formed integrally in a stepped shape with their axes aligned. The guide holes g1, g2, and g3 are axially drilled through the column portions 21a, 21b, 21c, and 21d and the fitting portions 22. Two screw holes 23 having a female screw formed on its inner peripheral surface are axially formed through the column portions 21a, 21b, 21c, and 21d outside the diameter of the fitting portions 22a, 22b, 22c, and 22d, respectively. Further, the substrate 10 has formed therethrough: the fitting holes 11 into which the fitting portions 22a, 22b, 22c, and 22d can be fitted; and the mounting holes 12 provided at positions corresponding to the screw holes 23. Therefore, the chip dies 20a, 20b, 20c, and 20d can be mounted on the substrate 10 by fitting the fitting portions 22a, 22b, 22c, and 22d into the fitting holes 11, and then screwing them with the mounting holes 12 and the screw holes 23 aligned. If the fastening jig 9 is used instead of the fastening jig 6, the fastening jig 9 has a simple structure and also is easy to manufacture. Further, if the fastening jig 50 is used instead of the fastening jig 6, the chip die 51 can be fixed to the substrate 54 by fitting the fitting portion 52b of the chip die 51 into the fitting hole 54a of the substrate 54 and attaching the snap ring 70 into the ring groove 52a. Thus, the fastening jig 50 having a simple structure can be manufactured inexpensively, and, besides, the chip die 51 can be easily mounted on and removed from the substrate 54.

Further, according to this clinching fastener press-fitting method, in the fastener press-fitting step, the upper turret 81 of the turret punch press 80 is provided with the small diameter portion 7a which is a part of the punch 7 whose diameter is reduced as the breakage prevention portion. Therefore, if a pressure equal to or higher than a predetermined pressure is applied to the punch 7 during press fitting of the first clinching fasteners f1, f2, and f3, the punch 7 itself is broken at the small diameter portion 7a, so that the breakage of the turret punch press 80 can be prevented.

Next, the clinching fastener press-fitting method of Embodiment 2 will be described. However, the same reference numerals will be used for the same configurations as in Embodiment 1, and the descriptions thereof will be omitted. FIG. 16 is a schematic diagram showing an outline of an apparatus used in a clinching fastener press-fitting method of Embodiment 2. A workpiece W1 is a rectangular metal plate, like the workpiece W of Embodiment 1. Screw feeders 3, 4, and 35 are installed on the first workbench 1 for each type of clinching fasteners. Like the screw feeders 3 and 4, the screw feeder 35 feeds a predetermined number of clinching fasteners housed therein. Further, the fastening jig 36, like the fastening jig 6, assists in surely press-fitting the clinching fasteners into the workpiece W1 when the clinching fasteners are press-fitted into the workpiece W1 by NC control.

Figure 17:
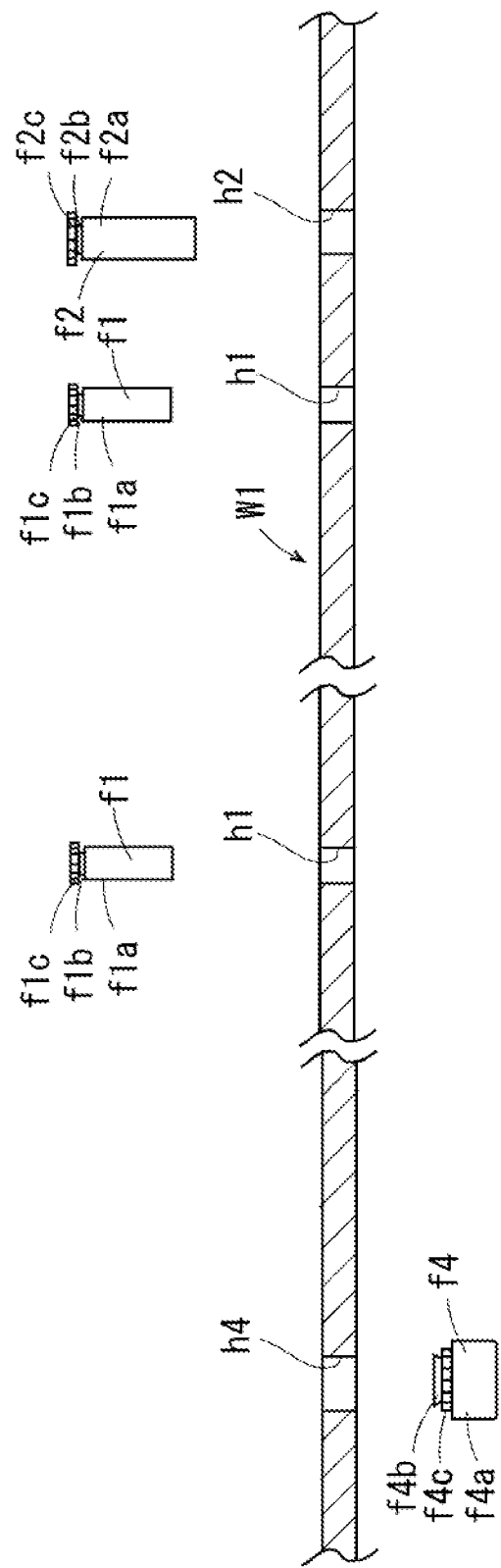
FIG. 17 is a partially enlarged cross-sectional view of clinching fasteners and a workpiece before press-fitting of the clinching fasteners according to the clinching fastener press-fitting method of Embodiment 2.

FIG. 17 is a partially enlarged sectional view of first clinching fasteners f1 and f2 that are press-fitted from a punch 7 side of a turret punch press 80, a second clinching fastener f4 press-fitted from a die 8 side of the turret punch press 80, and the workpiece W1 having drilled therein press-fit holes h1, h2, and h4 into which the first and second clinching fasteners f1, f2, and f4 are press-fitted. The press-fit holes h1, h2, and h4 are drilled by NC control using the turret punch press 80. The second clinching fastener f4 is an M8 nut. These first and second clinching fasteners f1, f2, and f4 are housed in the screw feeders 3, 4, and 35, respectively. The second clinching fastener f4 consists of a cylindrical or polygonal tubular body portion f4a provided with a female screw in the axial direction, a groove portion f4b formed at one end of the body portion, and a knurl portion f4c. The first clinching fasteners f1 and f2 are the same as those in Embodiment 1.

Figure 18:
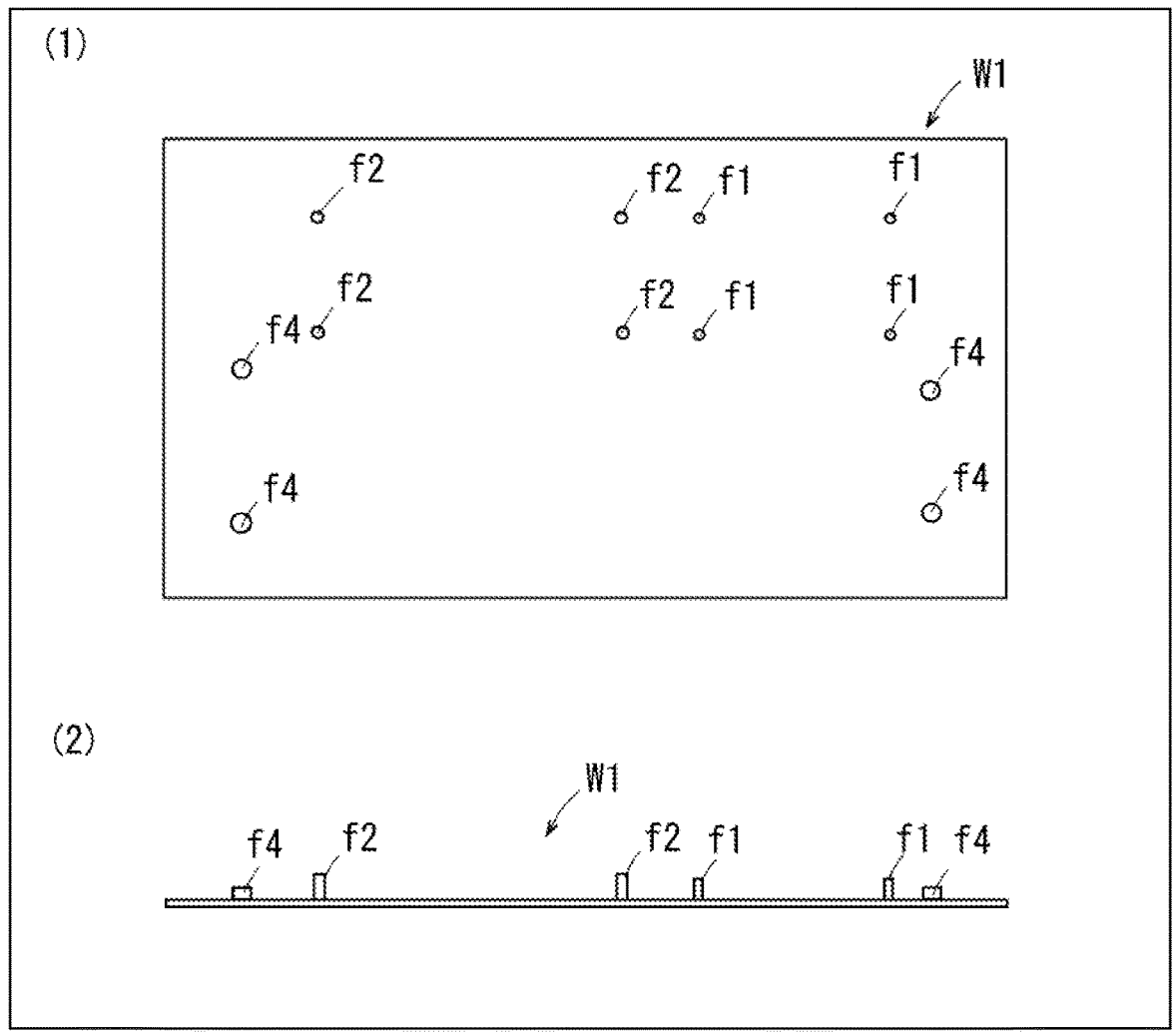
FIG. 18 includes a plan view and a front view of the workpiece after press-fitting of the clinching fasteners according to the clinching fastener press-fitting method of Embodiment 2.

FIG. 18 includes a plan view and a front view of the workpiece W1 into which the first and second clinching fasteners f1, f2, and f4 are press-fitted. The workpiece W1 shown in FIG. 18 is the workpiece W1 as a finished product by this clinching fastener press-fitting method.

Figure 19:
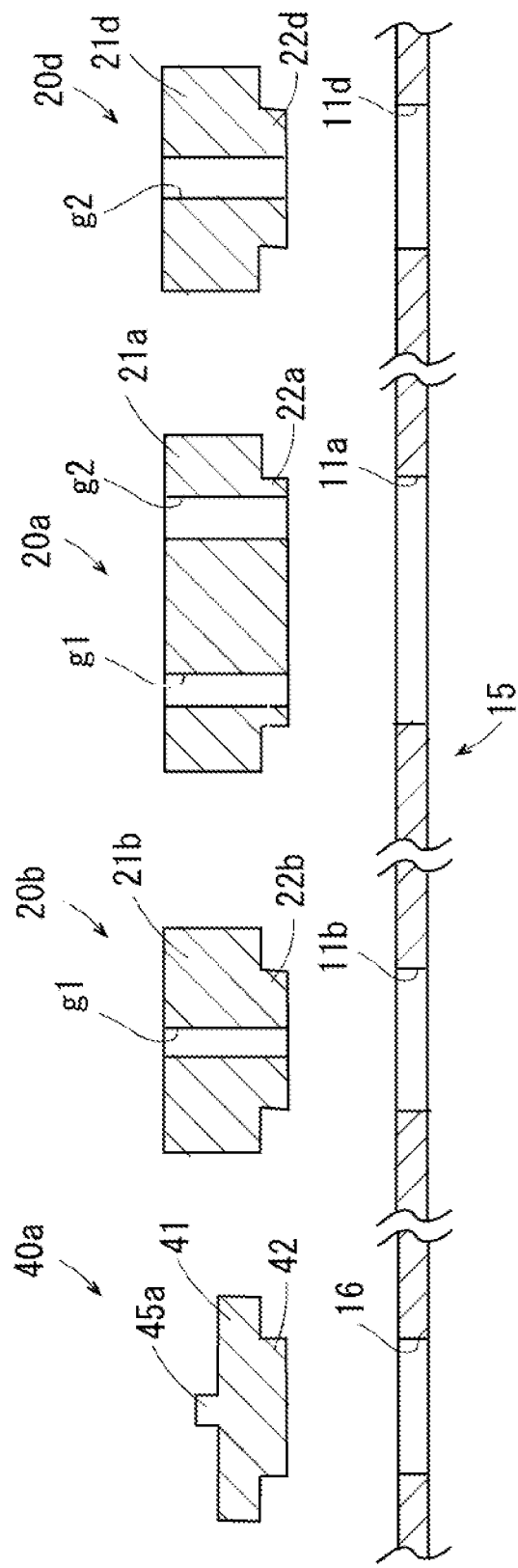
FIG. 19 is a partially enlarged cross-sectional view of chip dies and a substrate before assembling according to the clinching fastener press-fitting method of Embodiment 2.
Figure 29:
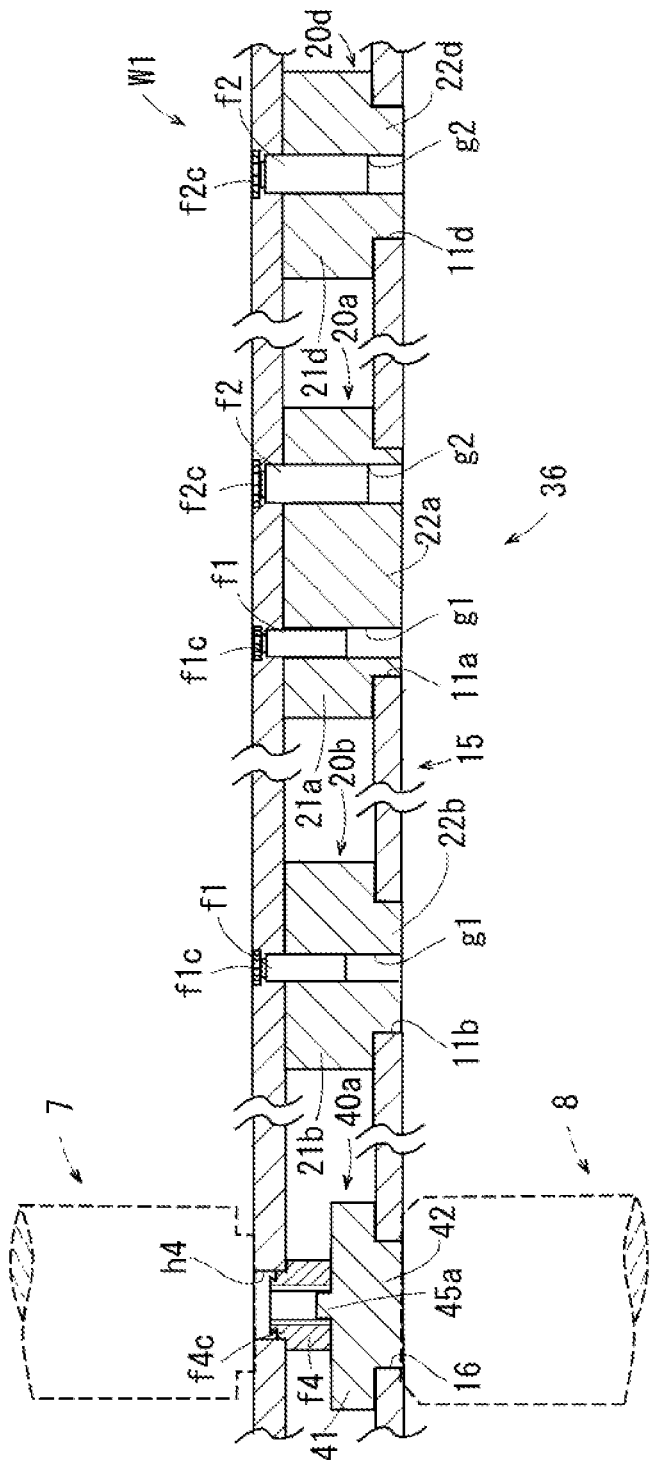
FIG. 29 is a partially enlarged cross-sectional view of a state in which the clinching fasteners are press-fitted into the workpiece according to the clinching fastener press-fitting method of Embodiment 2.

FIG. 19 is a partially enlarged cross-sectional view of four types of chip dies 20a, 20b, 20d, and 40a and a substrate 15 constituting the fastening jig 36. The chip dies 20a, 20b, and 20d are the same as those in Embodiment 1. The chip die 40a includes a cylindrical column portion 41 and a cylindrical fitting portion 42 having a diameter smaller than the diameter of the column portion 41, which are formed integrally, and a convex portion 45a as a mounting portion is formed at an upper end of the column portion 41. The axial length of the chip die 40a is determined from the lengths of the chip dies 20a, 20b and 20d. Specifically, as shown in FIG. 29 which will be described later, the length of the column portion 41 excluding the convex portion 45a of the chip die 40a is a length obtained by subtracting the length of the body portion f4a of the second clinching fastener f4 from the length of each of the column portions 21a, 21b, 21c, and 21d of the chip dies 20a, 20b, 20d. This chip die 40a is for the second clinching fastener f4.

Figure 20:
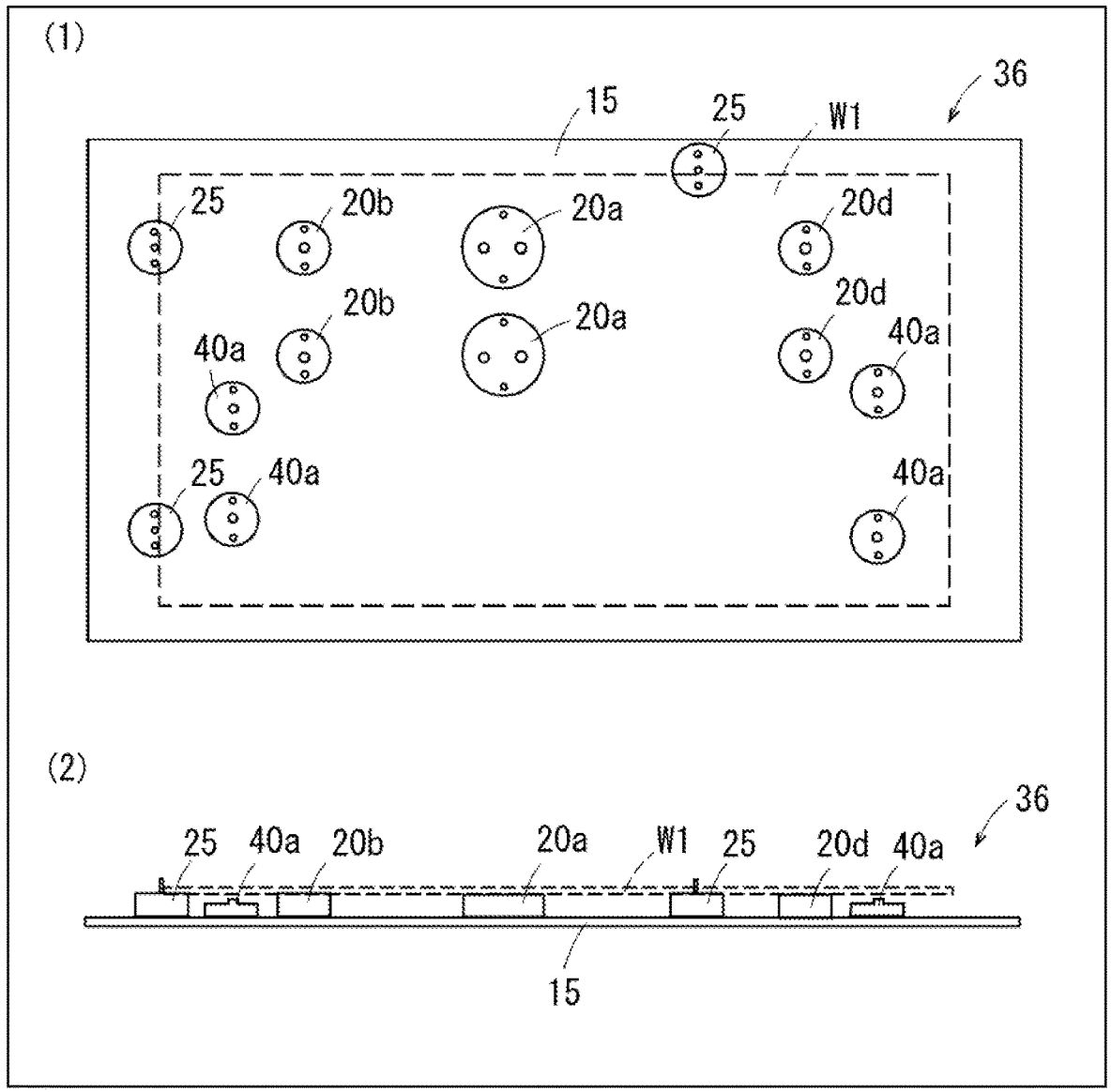
FIG. 20 includes a plan view and a front view of a fastening jig according to the clinching fastener press-fitting method of Embodiment 2.

As shown in FIG. 19, the substrate 15 is made of a metal having substantially the same shape and thickness as those of the workpiece W1, and has formed therethrough fitting holes 11a, 11b, 11d, and 16 into which the fitting portions 22a, 22b, 22d, and 42 of the chip dies 20a, 20b, 20d, and 40a are fitted. When the fitting portions 22a, 22b, 22d, and 42 are fitted into the fitting holes 11a, 11b, 11d, and 16 and the chip dies 20a, 20b, 20d, and 40a are mounted on the substrate 15, the fastening jig 36 shown in FIG. 20 is obtained. The center positions of the guide holes g1 and g2 and the convex portion 45a completely coincide with the center positions of the press-fit holes h1, h2, and h4 of the workpiece W1. Therefore, if the fitting holes 11a, 11b, 11d, and 16 are drilled by the turret punch press 80 using the data on the press-fit holes h1, h2, h4 of the workpiece W1, the fitting holes 11a, 11b, 11d, and 16 can be drilled in the substrate 15 with high accuracy.

Figure 21:
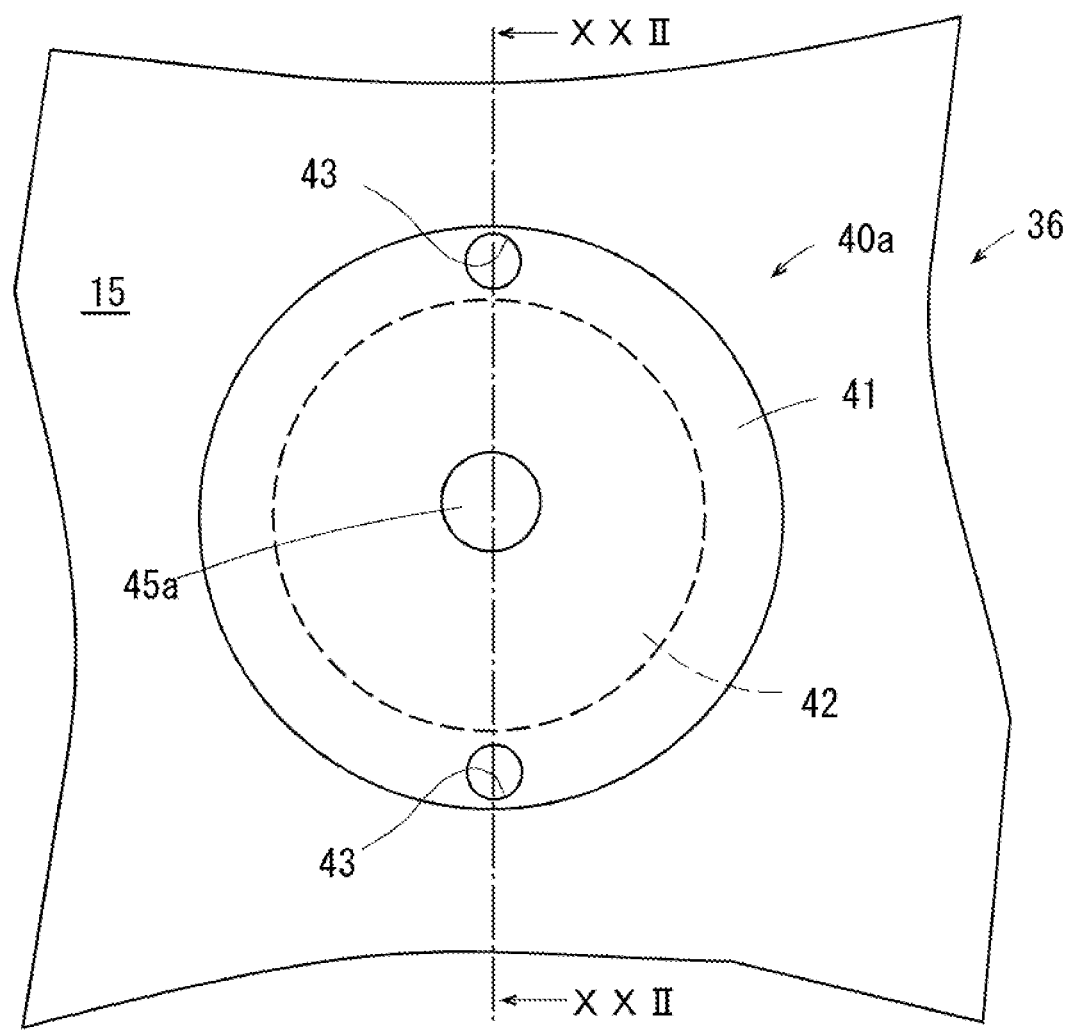
FIG. 21 is a partially enlarged plan view of the fastening jig according to the clinching fastener press-fitting method of Embodiment 2.
Figure 22:
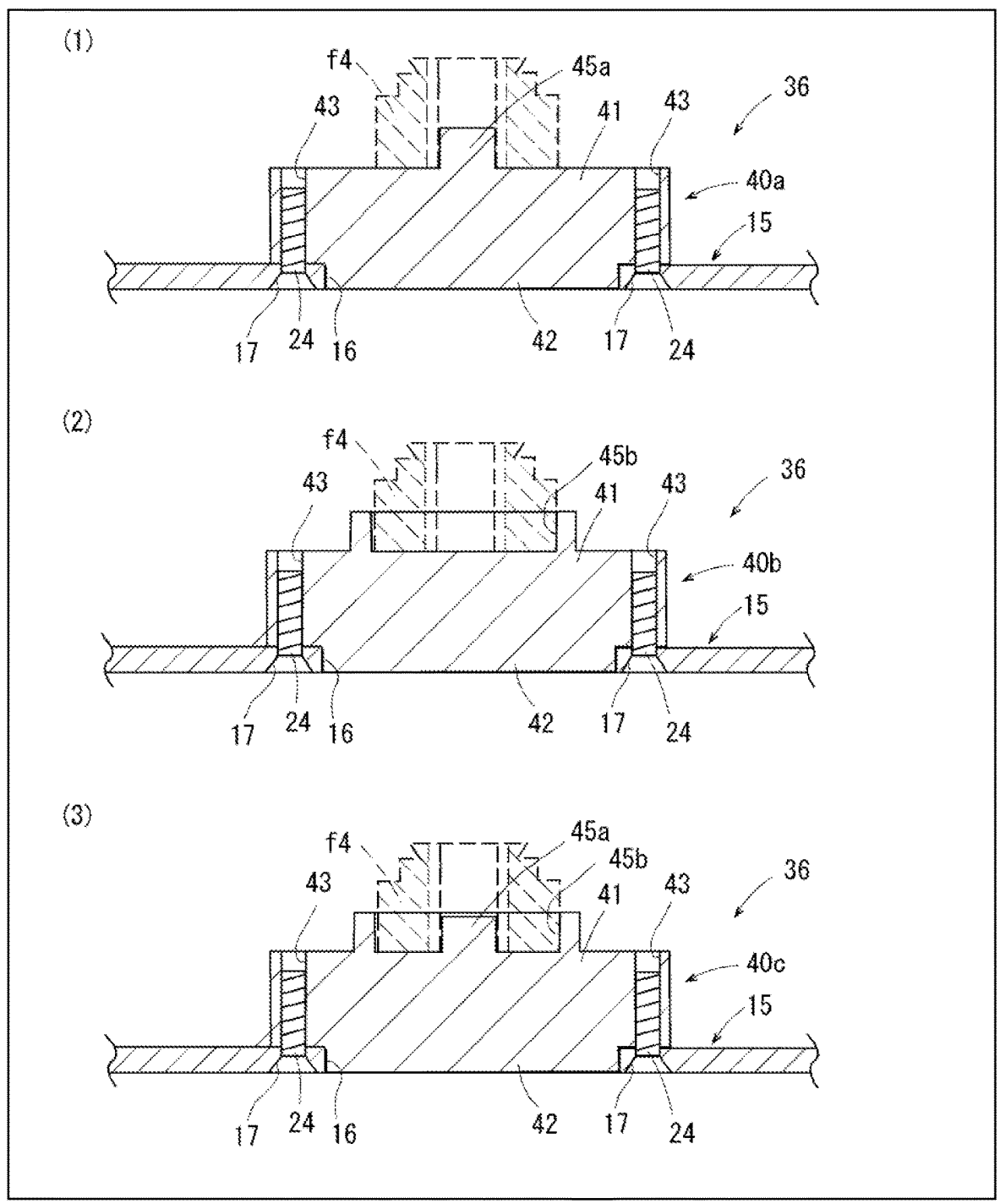
FIG. 22 includes cross-sectional views each taken along a line XXII-XXII in FIG. 21 according to the clinching fastener press-fitting method of Embodiment 2.

Next, a method of mounting the chip die 40a on the substrate 15 will be described with reference to FIGS. 21 and 22. As shown in FIGS. 21 and 22, two screw holes 43 having a female screw formed on its inner peripheral surface are axially formed through the column portion 41 outside the diameter of the fitting portion 42 of the chip die 40a. Mounting holes 17 are formed through the substrate 15 at positions corresponding to the screw holes 43. The fitting portion 42 of the chip die 40a is fitted into fitting holes 16 of the substrate 15, and mounting screws 24, which are male screws, are inserted into the mounting holes 17 and the screw holes 43 and tightened, so that the chip die 40a is mounted on the substrate 15. All the chip dies 20a, 20b, 20d, and 40a are mounted on the substrate 15 to complete the fastening jig 36. Here, not only the convex portion 45a shown in FIG. 22 (1), but also a concave portion 45b shown in FIG. 22 (2) or a combination of a concave portion 45b and a convex portion 45a shown in FIG. 22 (3) can also be used as the mounting portion. However, the diameter of the concave portion 45b is slightly larger than the diameter of the second clinching fastener f4.

As described above, the mounting portion is the convex portion 45a, the concave portion 45b, and the convex portion 45a and the concave portion 45b, which are provided at the upper end of the column portion 41, and thus the second clinching fastener f4 can be securely mounted on the fastening jig 36. That is, when the mounting portion is the convex portion 45a, the convex portion 45a is inserted into the female screw portion of the second clinching fastener f4 for positioning, so that the second clinching fastener f4 can be securely mounted on the fastening jig 36. Further, when the mounting portion is the concave portion 45b, the outer peripheral portion of the second clinching fastener f4 is inserted into the concave portion 45b for positioning, so that the second clinching fastener f4 can also be securely mounted on the fastening jig 36. Further, when the mounting portion is the convex portion 45a and the concave portion 45b, both the female screw portion and the outer peripheral portion of the second clinching fastener f4 are positioned, and the second clinching fastener f4 can be securely mounted on the fastening jig 36.

Figure 23:
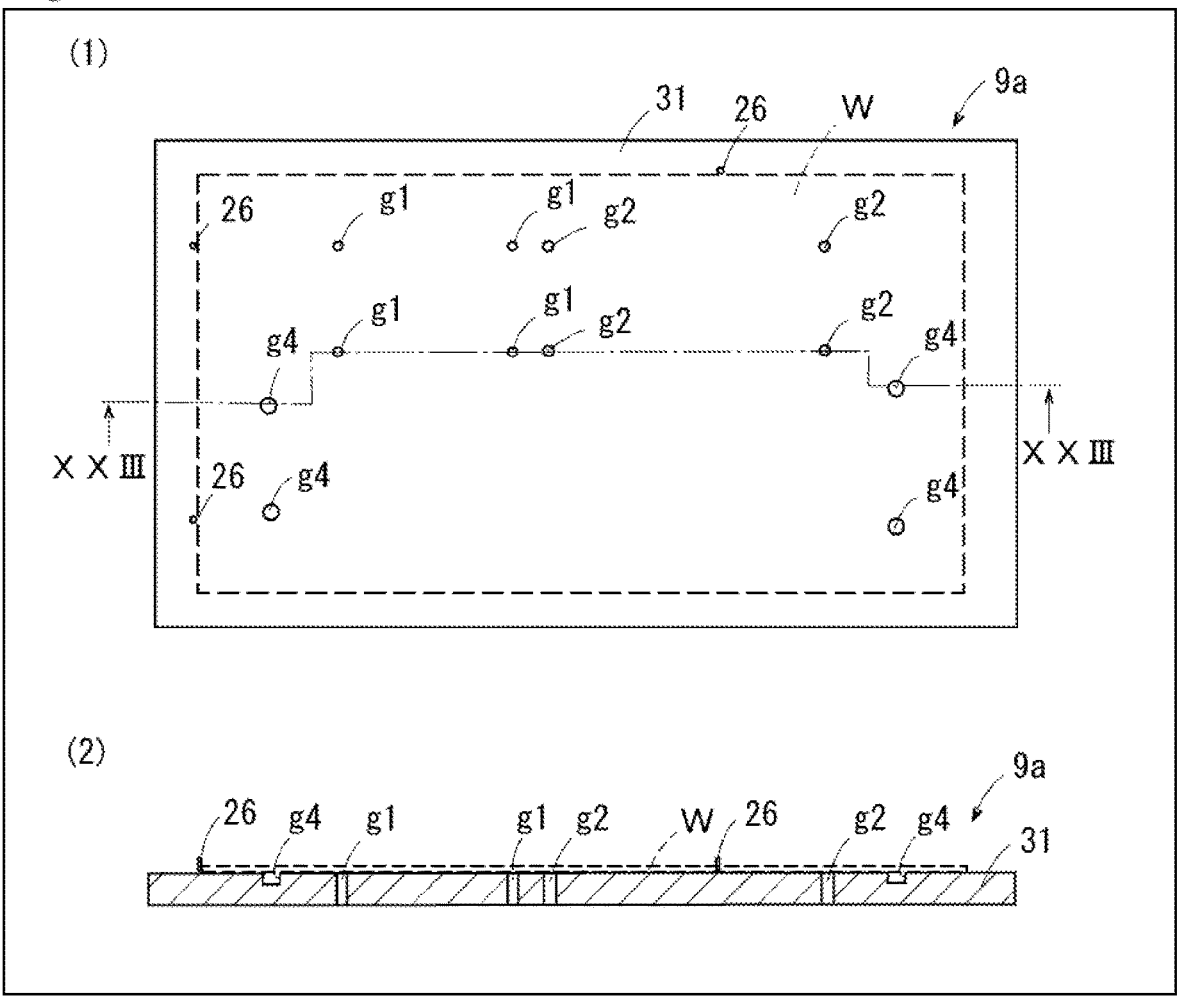
FIG. 23 includes a plan view of another fastening jig according to the clinching fastener press-fitting method of Embodiment 2, and a cross-sectional view taken along a line XXIII-XXIII in FIG. 23 (1).

Further, instead of the fastening jig 36, a fastening jig 9a shown in FIG. 23 can also be used. However, FIG. 23 (1) is a plan view of the fastening jig 9a. Further, FIG. 23 (2) is a cross-sectional view taken along the line XXIII-XXIII in FIG. 23 (1). This fastening jig 9a is a thick plate 31 having a thickness slightly longer than the length of the longest one among the first clinching fasteners f1, f2, and f3. The thick plate 31 has directly drilled therein the guide holes g1 and g2 that guide the first clinching fasteners f1 and f2, and the concave portion g4 as the mounting portion for mounting the second clinching fastener f4. The diameter of the concave portion g4 is slightly larger than the diameter of the second clinching fastener f4. In addition, instead of the concave portion g4, a convex portion may be provided at the center of the concave portion g4. Or, a convex portion may be provided at the center of a concave portion having a diameter larger than that of the concave portion g4. This fastening jig 9a has a simple structure and is easy to manufacture, and is particularly suitable when the workpiece is small.

Figure 24:
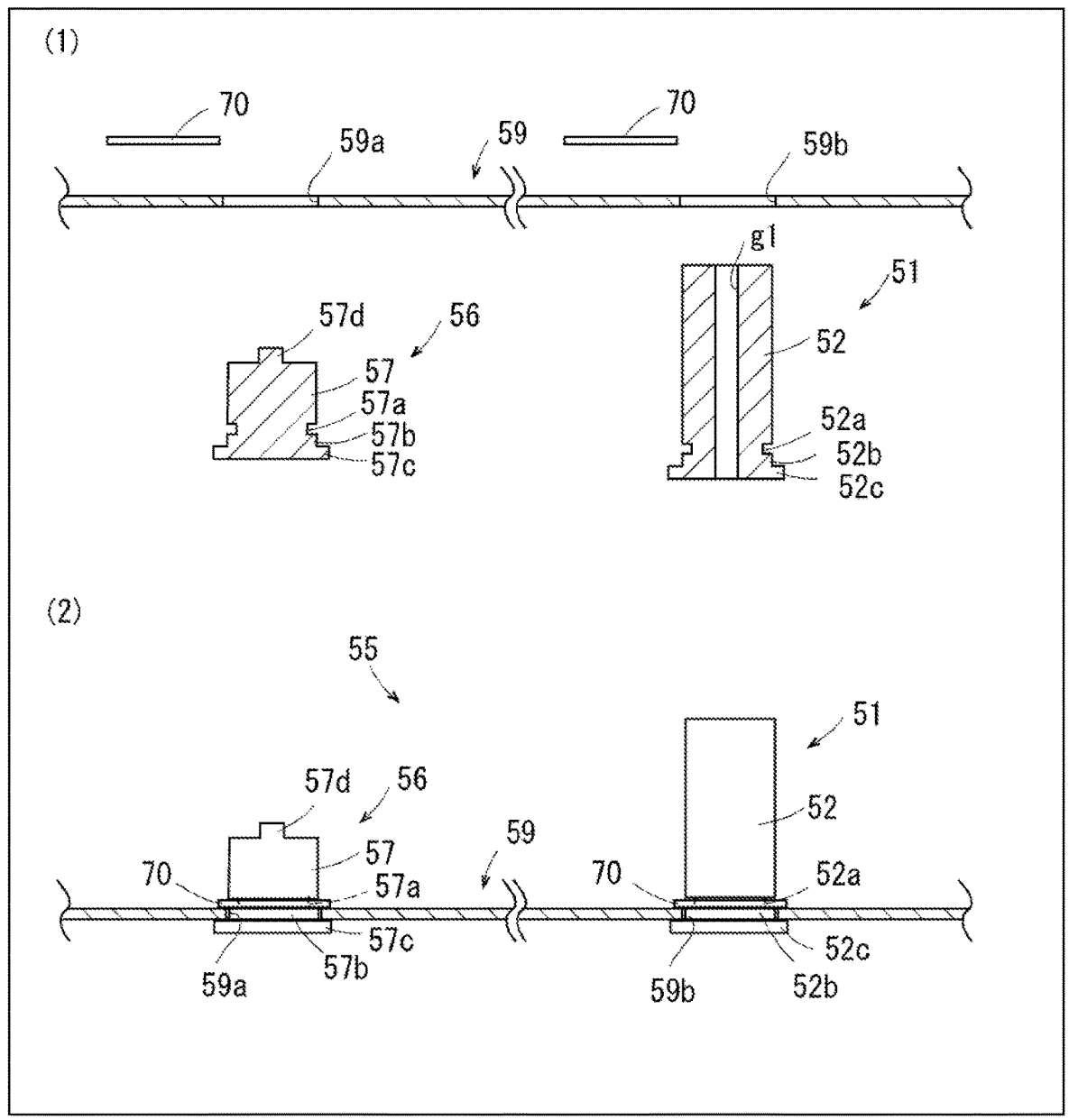
FIG. 24 includes partially enlarged cross-sectional views of still another fastening jig before and after assembling according to the clinching fastener press-fitting method of Embodiment 2.

Further, instead of the fastening jig 6, a fastening jig 55 shown in FIG. 24 (2) can be used. Here, FIGS. 24 (1) and 24 (2) are partially enlarged cross-sectional views of the fastening jig 55 before and after assembling. While many chip dies are actually assembled on the substrate 59, the chip die 51 for the first clinching fastener f1 and the chip die 56 for the second clinching fastener f4 are shown, and only the chip die 56 will be described, in particular. As shown in FIG. 24 (1), the fastening jig 55 is composed of the chip dies 51 and 56, the substrate 59, and the snap ring 70. The chip die 51 is the same as that in Embodiment 1. The chip die 56 includes a cylindrical column portion 57, a ring groove 57a, a fitting portion 57b, and a substrate holding portion 57c which are formed integrally. The ring groove 57a is a groove for attaching the snap ring 70. The fitting portion 57b has the same outer diameter as that of the column portion 57, and its axial length is substantially the same as the thickness of the substrate 59. The substrate holding portion 57c has an outer diameter slightly larger than the outer diameter of the column portion 57, holds the substrate 59 together with the snap ring 70 with the substrate 59 being sandwiched between the substrate holding portion 57c and the snap ring 70, and serves to fix the chip die 56 to the substrate 59. A convex portion 57d as a mounting portion is formed at an upper end of the column portion 57. Further, the substrate 59 is made of metal having substantially the same shape as that of the workpiece W1, and has formed therethrough fitting holes 59b and 59a into which fitting portions 52b and 57b can be fitted.

To assemble the fastening jig 55, the chip die 56 is fitted into the fitting hole 59a of the substrate 59 from the column portion 57, and the fitting portion 57b is fitted into the fitting hole 59a. The chip die 56 is mounted and fixed on the substrate 59 by fitting the snap ring 70 into the ring groove 57a for attachment. The chip die 51 is mounted in the same manner as in Embodiment 1. As a result, the fastening jig 55 shown in FIG. 24 (2) is assembled.

Next, this clinching fastener press-fitting method will be described with reference to the flowchart shown in FIG. 25. First, in step S11, the press-fit holes h1, h2, and h4 are drilled for all the workpieces W1s using the turret punch press 80. The specific method, its action and effect are the same as in step S1 of Embodiment 1. Step S11 is a drilling step.

Figure 26:
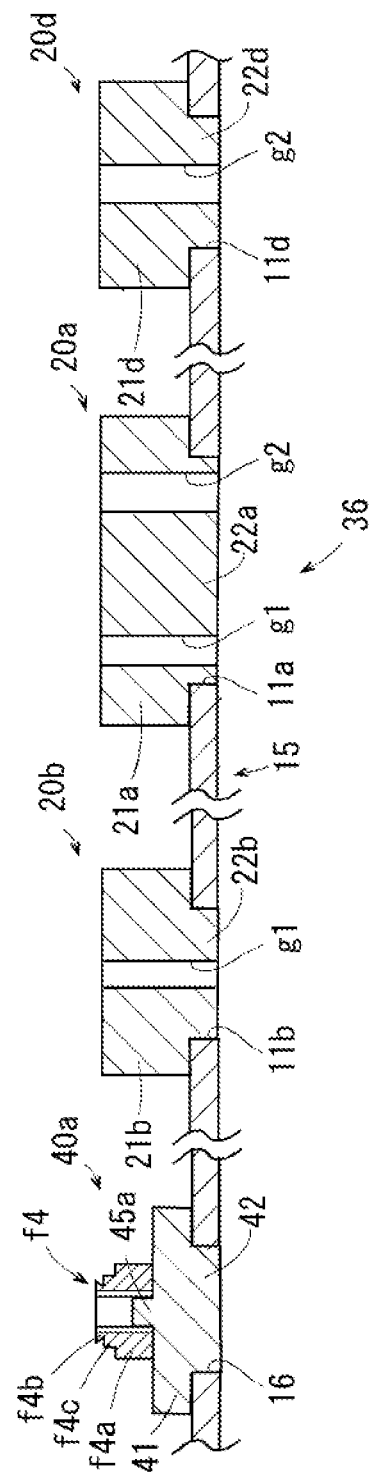
FIG. 26 is a partially enlarged cross-sectional view of a state in which clinching fasteners are mounted on the fastening jig according to the clinching fastener press-fitting method of Embodiment 2.

In step S12, as shown in FIG. 26, the convex portion 45a of the chip die 40a is inserted into the female screw portion of the body portion f4a of the second clinching fastener f4 on the first workbench 1, and the second clinching fastener f4 is mounted on the chip die 40a of the fastening jig 36. First, a predetermined number of the second clinching fasteners f4 are fed from the screw feeder 35, and all the second clinching fasteners f4 are mounted on the convex portions 45a of the chip dies 40a. Since the centers of the press-fit hole h4 of the workpiece W1 and the convex portion 45a of the chip die 40a are exactly aligned with each other, the second clinching fastener f4 can be surely press-fitted into the press-fit hole h4 of the workpiece W1 in the subsequent fastener press-fitting step. If not all the second clinching fasteners f4 have been inserted into all the press-fit holes h4 of the workpiece W1, the second clinching fasteners f4 become excessive or deficient. So, it is easy to check for excess or deficiency. Step S12 is a fastener mounting step.

Figure 27:
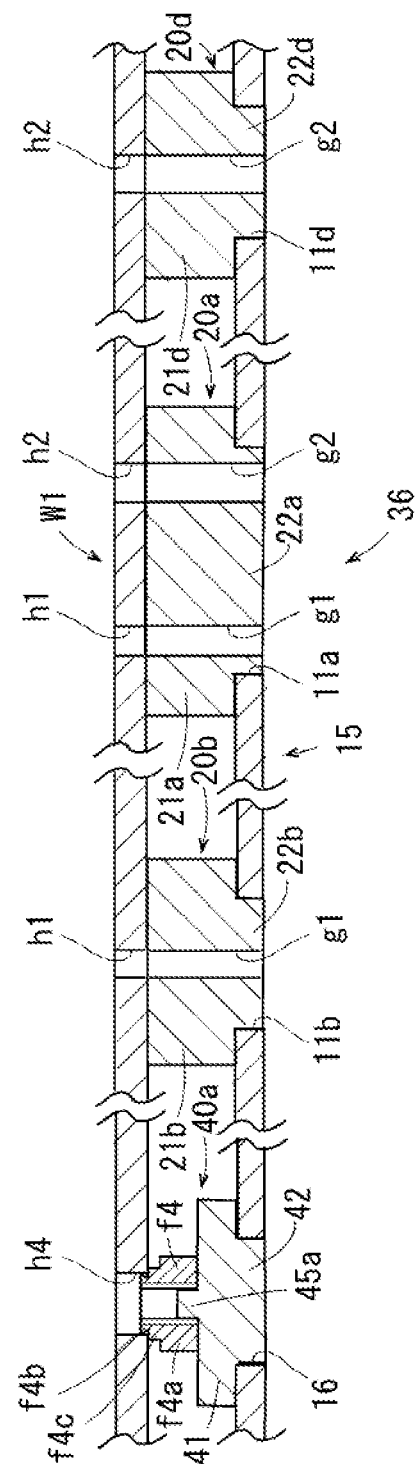
FIG. 27 is a partially enlarged cross-sectional view of a state in which the workpiece is mounted on the fastening jig according to the clinching fastener press-fitting method of Embodiment 2.

In step S13, as shown in FIG. 27, the workpiece W1 having the press-fit holes h1, h2, and h4 drilled therein is mounted on the fastening jig 36 on the first workbench 1. Alignment pins 25 are mounted at the three positions of the substrate 15, and the workpiece W1 is aligned with the alignment pins 25, so that the press-fit holes h1 and h2 of the workpiece W1 and the guide holes g1 and g2 of the chip dies 20a, 20b and 20d are exactly aligned with each other. Further, the groove portion f4b of the second clinching fastener f4 is inserted into the press-fit hole h4 of the workpiece W1. Step S13 is a workpiece mounting step.

Figure 28:
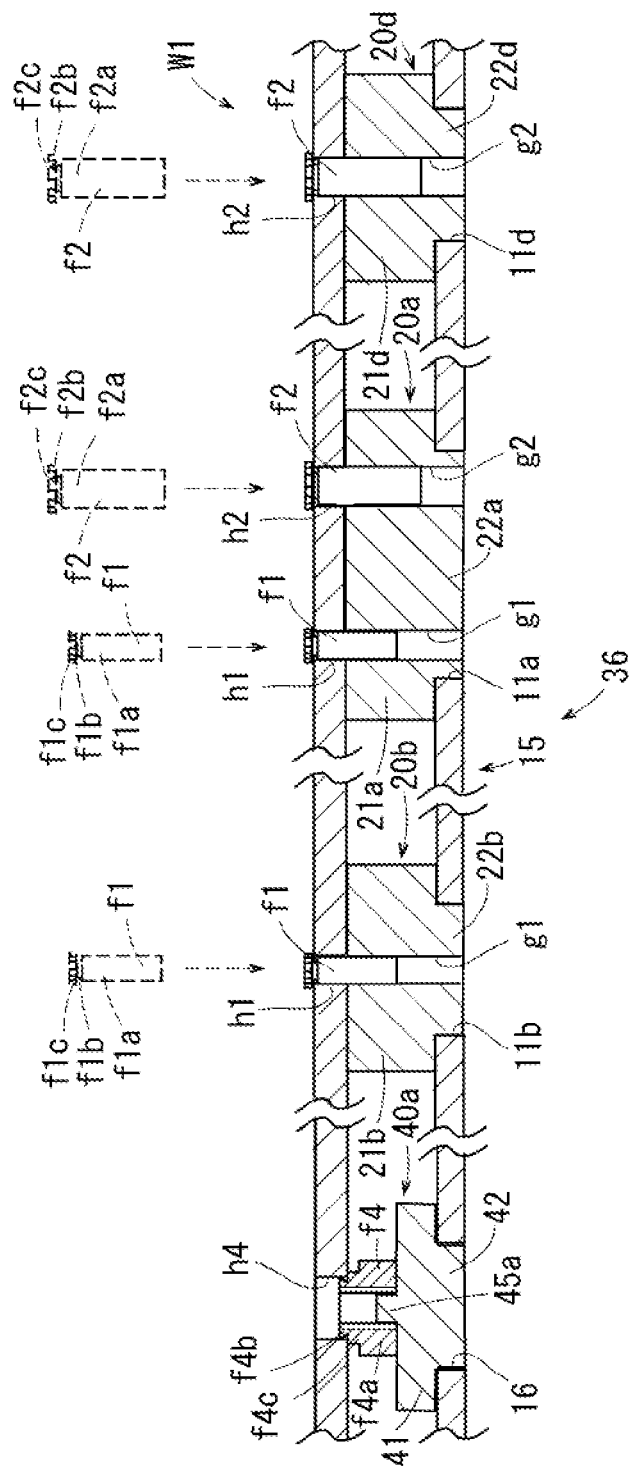
FIG. 28 is a partially enlarged cross-sectional view of a state in which the clinching fasteners are inserted into the workpiece according to the clinching fastener press-fitting method of Embodiment 2.

In step S14, as shown in FIG. 28, on the first workbench 1, the first clinching fasteners f1 and f2 are mounted to the press-fit holes h1 and h2 of the workpiece W1 and the guide holes g1 and g2 of the chip dies 20a, 20b and 20d. First, a predetermined number of the first clinching fasteners f1 are fed from the screw feeder 3, and all the first clinching fasteners f1 are inserted into all the press-fit holes h1 (guide holes g1) of the workpiece W1. As a result, the body portions f1a and the groove portions f1b of the first clinching fasteners f1 are inserted into the press-fit holes h1 and the guide holes g1. Similarly, a predetermined number of the first clinching fasteners f2 are fed from the screw feeder 4, and all the first clinching fasteners f2 are inserted into all the press-fit holes h2 (guide holes g2) of the workpiece W1. As a result, the body portions f2a and the groove portions f2b of the first clinching fasteners f2 are inserted into the press-fit holes h2 and the guide holes g2. Since the press-fit holes h1 and h2 of the workpiece W1 and the guide holes g1 and g2 of the chip dies 20a and 20b of the fastening jig 36 are exactly aligned with each other, the first clinching fasteners f1 and f2 can be surely placed perpendicularly to the surface of the workpiece W1. If not all the first clinching fasteners f1 and f2 have been inserted into all the press-fit holes h1 and h2 of the workpiece W1, the first clinching fasteners f1 and f2 become excessive or deficient. So, it is easy to check for excess or deficiency. Step S14 is a fastener insertion step.

In step S15, as shown in FIG. 29, the knurl portions f1c, f2c of all the first clinching fasteners f1 and f2 and the knurl portion f4c of the second clinching fastener f4 are press-fitted into the press-fit holes h1, h2, and h4 of the workpiece W1 mounted on the fastening jig 36 by NC control using the turret punch press 80. However, before step S15 is performed, the punch 7 is mounted in place of the punch 83 mounted on the upper turret 81 shown in FIG. 16, and the die 8 is mounted in place of the die 85 mounted on the lower turret 82. The tips of the punch 7 and the die 8 are flattened.

When step S15 is performed, the upper turret 81 and the lower turret 82 are rotated according to the program to set the predetermined punch 7 and die 8 at the processing position, and the workpiece W1 is controlled in the XY-axis directions, so that the predetermined press-fit holes h1, h2, and h4 are positioned at the processing positions. The punch 7 and the die 8 are then controlled in the Z-axis direction, and the first clinching fasteners f1 and f2 and the second clinching fasteners f4 are press-fitted into the press-fit holes h1, h2, and h4 of the workpiece W1. This is repeated for all the first clinching fasteners f1 and f2 and the second clinching fasteners f4, and the press-fitting of the first clinching fasteners f1 and f2 and the second clinching fasteners f4 into the press-fit holes h1, h2, and h4 of the workpiece W1 is completed. In this way, the first clinching fasteners f1 and f2 and the second clinching fasteners f4 are press-fitted into the press-fit holes h1, h2, and h4 of the workpiece W1 by NC control, and thus it is not necessary to manually align the first clinching fasteners f1 and f2 and the second clinching fasteners f4 with the processing positions, which makes it possible not only to significantly reduce the workpiece time, but also to ensure the safety of the worker. Step S15 is a fastener press-fitting step. Depending on the types of the first clinching fasteners f1 and f2 and the second clinching fasteners f4, the descending speed of the punch 7 and the stop time (pressurization time) at the bottom dead center are changed and controlled.

Figure 30:
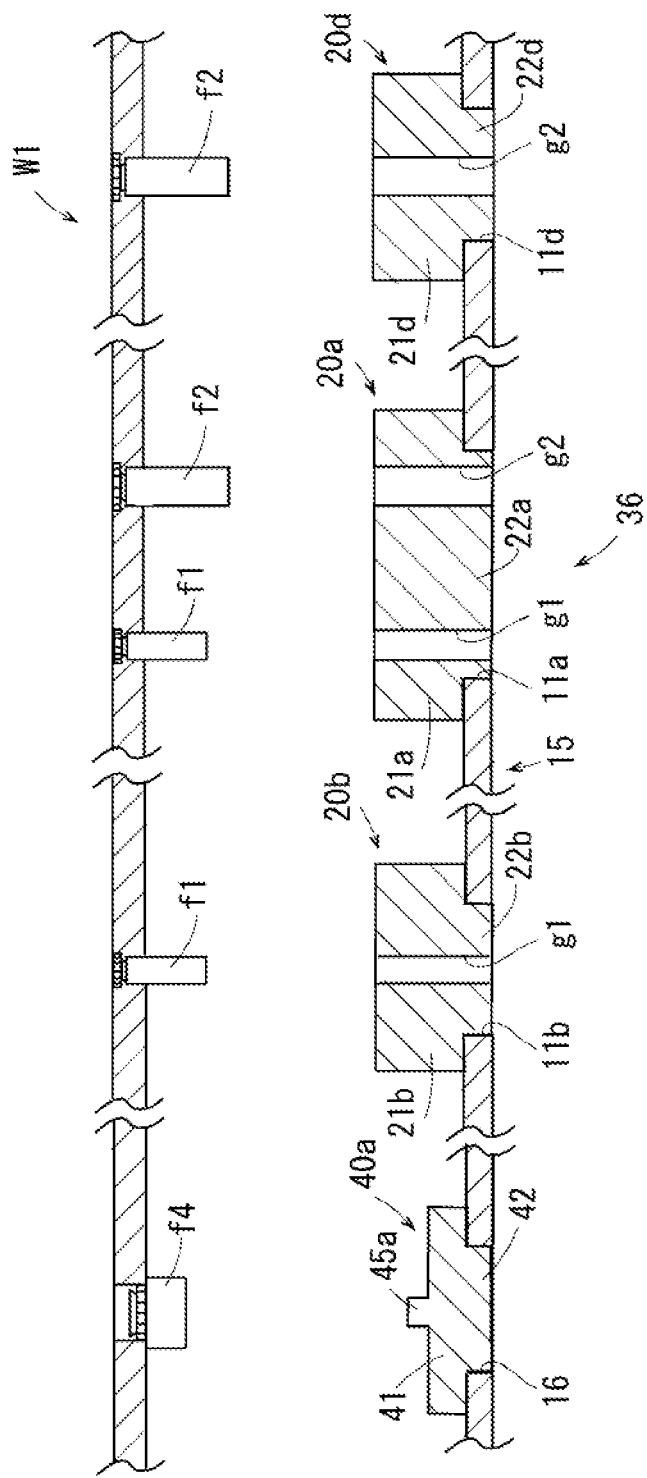
FIG. 30 is a partially enlarged cross-sectional view of a state in which the workpiece is removed from the fastening jig according to the clinching fastener press-fitting method of Embodiment 2.

In step S16, as shown in FIG. 30, the workpiece W1 is removed from the fastening jig 36 on the second workbench 2. As a result, a finished product is completed, which is one workpiece W1 into which the first clinching fasteners f1 and f2 and the second clinching fasteners f4 are press-fitted as shown in FIGS. 18 (1) and 18 (2). However, the workpiece W1 in FIGS. 18 (1) and 18 (2) is a workpiece in which the upper surface and the lower surface are inverted by laterally inverting the workpiece W1 in FIG. 30. Step S16 is a workpiece removal step.

In step S17, if the press-fitting of the first clinching fasteners f1 and f2 and the second clinching fasteners f4 has not been completed for a predetermined number of workpieces W1s (N), the steps are performed from step S12 for the next workpiece W1. Further, when the press-fitting of the first clinching fasteners f1 and f2 and the second clinching fasteners f4 has been completed for a predetermined number of workpieces W1s (Y), the work is completed.

According to the clinching fastener press-fitting method of Embodiment 2, in the drilling step S11, the plurality of press-fit holes h1, h2, and h4 are drilled in the workpiece W1 which is a metal plate by NC control using the turret punch press 80. Further, in the fastener mounting step S12, only a predetermined number of the second clinching fasteners f4 are taken out from the screw feeder 35, thereby making it possible to prevent the worker from forgetting to mount the second clinching fasteners f4 on the mounting portion 45a of the fastening jig 36. Further, the workpiece W1 is mounted in such a manner that the workpiece W1 is superposed on the fastening jig 36 in the workpiece mounting step S13, so that the fastening jig 36 can guide the first and second clinching fasteners f1, f2, and f4, and the first clinching fasteners f1 and f2 are easily inserted into the press-fit holes h1 and h2, in the subsequent fastener insertion step S14. Further, in the fastener insertion step S14, only a predetermined number of the first clinching fasteners f1 and f2 are taken out from the screw feeders 3 and 4, thereby making it possible to prevent the worker from forgetting to insert the first clinching fasteners f1 and f2 into the press-fit holes h1 and h2 of the workpiece W1 mounted on the fastening jig 36.

In the fastener press-fitting step S15, the first and second clinching fasteners f1, f2, and f4 are press-fitted into the press-fit holes h1, h2, and h4 of the workpiece W1 mounted on the fastening jig 36 by NC control using the turret punch press 80. Thus, it is not necessary to manually align the first and second clinching fasteners f1, f2, and f4 with processing positions, which makes it possible not only to significantly reduce the working time, but also to ensure the safety of the worker. As compared with the case of using a plurality of insertion machines, it is not necessary to manually transfer the workpiece among the insertion machines, and the handling is easy. In addition, a large installation space is unnecessary, and space can be saved. Furthermore, if one already possesses the turret punch press 80, it is unnecessary to newly introduce an insertion machine, so that the capital investment can be significantly reduced. Therefore, according to this clinching fastener press-fitting method, the clinching fasteners f1, f2, and f4 can be automatically press-fitted into the workpiece W1, and the manufacturing cost can be reduced.

Further, according to the clinching fastener press-fitting method, the fastening jig 36 consists of: the substantially cylindrical chip dies 20a, 20b, and 20d of a predetermined axial length, which have drilled therein the guide holes h1 and h2 for guiding the outer peripheral portions of the first clinching fasteners f1 and f2; the substantially cylindrical chip die 40a of a predetermined axial length, which is provided with the convex portion 45a on which the second clinching fastener f4 is mounted; and the metal substrate 15 in which the respective chip dies 20a, 20b, 20d, and 40a can be mounted at the press-fitting positions for the first and second clinching fasteners f1, f2, and f4. Therefore, the substrate 15 can be made thinner and reduced in weight, and, besides, the substrate 15 and the chip dies 20a, 20b, 20c, and 40a can be manufactured separately. Further, depending on the degree of density of the press-fitting positions for the first and second clinching fasteners f1, f2 and f4, one or more guide holes g1 and g2 and convex portions 45a can be provided in the chip dies 20a, 20b, 20d, and 40a. The diameters of the chip dies 20a, 20b, 20d, and 40a can be changed accordingly.

Further, according to this clinching fastener press-fitting method, the chip dies 40a, 40b, and 40c include the large-diameter column portion 41 and the small-diameter cylindrical fitting portion 42, which are formed integrally in a stepped shape with their axes aligned. Two screw holes 43 having a female screw formed on their inner peripheral surface are axially formed through the column portion 41 outside the diameter of the fitting portion 42. Further, the substrate 15 has formed therethrough: the fitting holes 16 into which the fitting portion 42 can be fitted; and the mounting holes 17 provided at positions corresponding to the screw holes 43. Therefore, the chip dies 40a, 40b, and 40c can be mounted on the substrate 15 by fitting the fitting portion 42 into the fitting holes 16, and then screwing it with the mounting holes 17 and the screw holes 43 aligned. If the fastening jig 9a is used instead of the fastening jig 36, the fastening jig 9a has a simple structure and also is easy to manufacture. Further, if the fastening jig 55 is used instead of the fastening jig 36, the chip dies 51 and 56 can be fixed to the substrate 59 by fitting the fitting portions 52b and 57b of the chip dies 51 and 56 into the fitting holes 59a of the substrate 59 and attaching the snap ring 70 to the ring grooves 52a and 57a. Thus, the fastening jig 55 having a simple structure can be manufactured inexpensively, and, besides, the chip dies 51 and 56 can be easily mounted on and removed from the substrate 59. The chip dies 20a, 20b, and 20d are the same as those in Embodiment 1. Further, other actions and effects are the same as those in Embodiment 1.

Next, a clinching fastener press-fitting method of Embodiment 3 will be described. In this clinching fastener press-fitting method, only one type or a plurality of types of second clinching fasteners are press-fitted into a workpiece. At this time, as the fastening jig, a fastening jig in which chip dies are mounted on a substrate by mounting screws (see FIG. 20) or a fastening jig using a thick plate (see FIG. 23) is used. However, when a fastening jig in which chip dies are mounted on a substrate by mounting screws is used, only chip dies for the second clinching fasteners (for example, 40a, 40b, and 40c shown in FIG. 22) are mounted on the substrate. Further, when a fastening jig using a thick plate is used, only mounting portions for the second clinching fasteners are provided on the thick plate. Further, as the fastening jig, a fastening jig in which a chip die is mounted on a substrate by a snap ring (see FIG. 24) can be used. However, only a chip die for the second clinching fastener (for example, the chip die 56 shown in FIG. 24) is mounted on the substrate. The other structures, effects, and the like of the fastening jig are the same as those in Embodiment 2.

Figure 25:
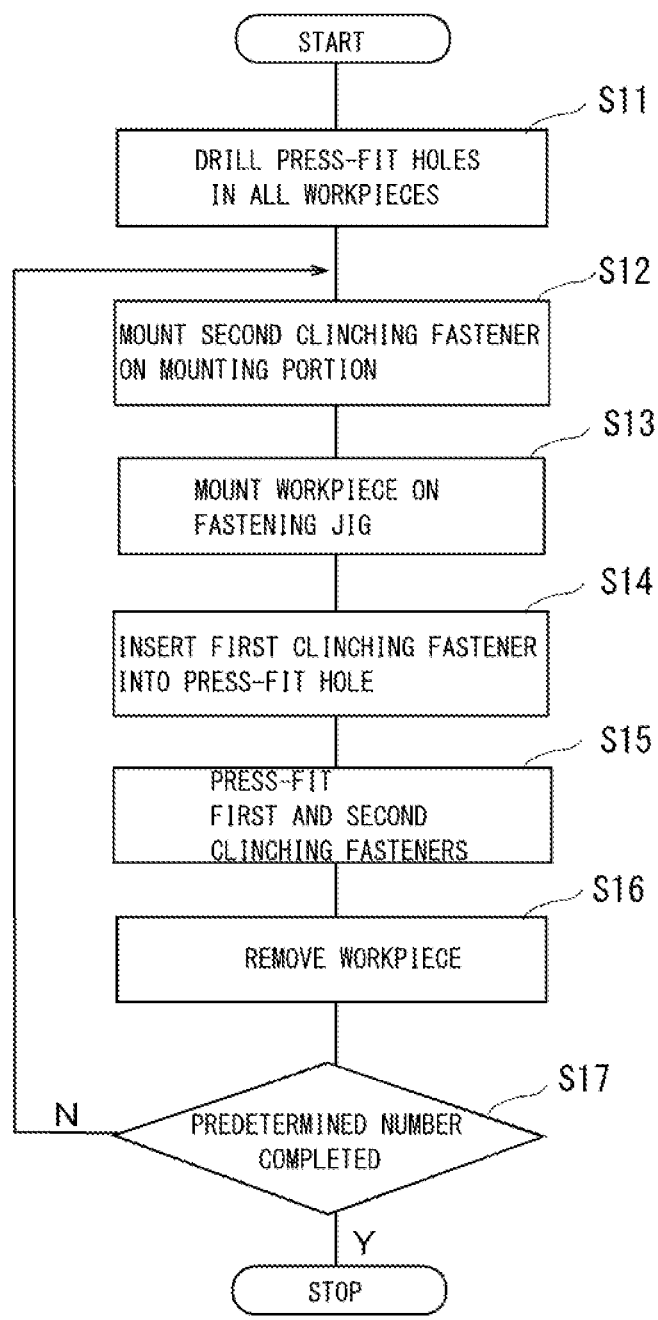
FIG. 25 is a flowchart of the clinching fastener press-fitting method according to Embodiment 2.

In the clinching fastener press-fitting method, substantially the same steps as those in the flowchart shown in FIG. 25 are performed. However, only the fastener insertion step S14 in FIG. 25 is omitted and each step is performed. According to the clinching fastener press-fitting method of Embodiment 3, the second clinching fasteners are surely mounted on the mounting portions of the fastening jig in the fastener mounting step, and thus the second clinching fasteners do not come off even if the fastening jig and the workpiece move at a high speed in the XY-axis directions in the fastener press-fitting step. Other actions and effects are the same as those in Embodiment 2.

The clinching fastener press-fitting method of the present invention has been described above in accordance with Embodiments 1 to 3, but the present invention is not limited thereto, and can be appropriately modified and applied as long as it does not contradict the technical idea of the present invention, of course. For example, in Embodiment 1, the chip die 20a has two guide holes g1 and g2 drilled therein, but a new chip die having three or more guide holes drilled therein may be adopted. Further, in Embodiments 1 and 2, the chip dies 20a, 20b, 20c, and 20d, and 40a, 40b, and 40c are mounted on the substrates 10 and 15, respectively, by the mounting screws 24. However, they may be mounted by any other means than the mounting screws 24, for example, by welding or adhesion.

REFERENCE SIGNS LIST 3, 4, 5, 35 Screw feeder
6, 9, 9a, 36, 50, 55 Fastening jig
7 Punch
7a Breakage prevention portion (small diameter portion)
10, 15, 54, 59 Substrate
11a, 11b, 11c, 11d, 16, 54a, 59a, 59b Fitting hole
12, 17 Mounting hole
20a, 20b, 20c, 20d, 40a, 40b, 40c, 51, 56 Chip die
21a, 21b, 21c, 21d, 41, 52, 57 Column portion
23, 43 Screw hole
22a, 22b, 22c, 22d, 42, 52b, 57b Fitting portion
30, 31 Thick plate
45a, 45b, g4, 57d Mounting portion
(45a, 57d Convex portion 45b, g4 Concave portion)
52a, 57a Ring groove
52c, 57c Substrate holding portion
f1, f2, f3, f4 Clinching fastener
(f1, f2, f3, First clinching fastener f4 Second clinching fastener)
h1, h2, h3, h4 Press-fit hole
g1, g2, g3 Guide hole
W, W1 Workpiece
80 Turret punch press
81 Upper turret
S1, S11 Drilling step
S12 Fastener mounting step
S2, S13 Workpiece mounting step
S3, S14 Fastener insertion step
S4, S15 Fastener press-fitting step

The invention claimed is:

1. A clinching fastener press-fitting method for press-fitting a plurality of clinching fasteners into a workpiece that is a metal plate, comprising:
   a drilling step of drilling press-fit holes at press-fitting positions of the workpiece to press-fit first clinching fasteners that are press-fitted from a punch side of a turret punch press by NC control using the turret punch press;
   a workpiece mounting step of mounting the workpiece so that the workpiece is superposed on a fastening jig that guides the first clinching fasteners;
   a fastener insertion step of inserting a predetermined number of the first clinching fasteners taken out from a screw feeder into the press-fit holes of the workpiece mounted on the fastening jig;
   a fastener press-fitting step of press-fitting the first clinching fasteners into the press-fit holes of the workpiece mounted on the fastening jig by NC control using the turret punch press; and
   a workpiece removal step of removing the workpiece from the fastening jig.

2. The clinching fastener press-fitting method according to claim 1, wherein the fastening jig is a plate-shaped thick plate of a predetermined thickness, which has drilled therein a guide hole for guiding an outer peripheral portion of each of the first clinching fasteners.

3. The clinching fastener press-fitting method according to claim 1, wherein the fastening jig consists of:
   a substantially cylindrical chip die of a predetermined axial length, which has drilled therein one or a plurality of guide holes for guiding an outer peripheral portion of each of the first clinching fasteners; and a metal substrate in which the chip die can be mounted at the press-fitting position for each of the first clinching fasteners.

4. The clinching fastener press-fitting method according to claim 3, wherein the chip die includes a cylindrical column portion and a cylindrical fitting portion having a diameter smaller than the diameter of the column portion, which are formed integrally in a stepped shape with their axes aligned, wherein the guide hole is axially drilled through the column portion and the fitting portion, and two or more screw holes having a female screw formed on their inner peripheral surface are axially formed through the column portion outside the diameter of the fitting portion, and wherein the substrate has formed therethrough, a fitting hole into which the fitting portion can be fitted, and mounting holes provided at positions corresponding to the screw holes.

5. The clinching fastener press-fitting method according to claim 3, wherein the chip die includes a cylindrical column portion, a ring groove having a diameter smaller than the diameter of the column portion, a fitting portion adjacent to the ring groove and having the same diameter as the diameter of the column portion, and a substrate holding portion adjacent to the fitting portion and having a diameter larger than the diameter of the column portion, which are formed integrally, wherein the substrate has formed therethrough a fitting hole into which the fitting portion can be fitted, and wherein the chip die is fixed to the substrate by fitting the fitting portion into the fitting hole and attaching a snap ring into the ring groove.

6. The clinching fastener press-fitting method according to claim 1, wherein, in the fastener press-fitting step, a punch having a breakage prevention portion for preventing breakage of the turret punch press is mounted on an upper turret of the turret punch press.

7. The clinching fastener press-fitting method according to claim 6, wherein the breakage prevention portion is a small diameter portion as a part of the punch whose diameter is reduced.

8. A clinching fastener press-fitting method for press-fitting a plurality of clinching fasteners into a workpiece that is a metal plate, the clinching fasteners consisting of:
first clinching fasteners that are press-fitted from a punch side of a turret punch press; and
second clinching fasteners that are press-fitted from a die side of the turret punch press, the method comprising:
a drilling step of drilling press-fit holes at press-fitting positions of the workpiece to press-fit the first and second clinching fasteners by NC control using the turret punch press;
a fastener mounting step of mounting a predetermined number of the second clinching fasteners taken out from a screw feeder on mounting portions of a fastening jig that guides the first and second clinching fasteners;
a workpiece mounting step of mounting the workpiece so that the workpiece is superposed on the fastening jig;
a fastener insertion step of inserting a predetermined number of the first clinching fasteners taken out from the screw feeder into the press-fit holes of the workpiece mounted on the fastening jig;
a fastener press-fitting step of press-fitting the first and second clinching fasteners into the press-fit holes of the workpiece mounted on the fastening jig by NC control using the turret punch press; and
a workpiece removal step of removing the workpiece from the fastening jig.

9. The clinching fastener press-fitting method according to claim 8, wherein the fastening jig is a plate-shaped thick plate of a predetermined thickness, which has drilled therein a guide hole for guiding an outer peripheral portion of each of the first clinching fasteners and is provided with a concave portion and/or convex portion that is the mounting portion on which each of the second clinching fasteners is mounted.

10. The clinching fastener press-fitting method according to claim 8, wherein the fastening jig consists of:
a substantially cylindrical chip die of a predetermined axial length, which has drilled therein one or a plurality of guide holes for guiding an outer peripheral portion of each of the first clinching fasteners;
a substantially cylindrical chip die of a predetermined axial length, which is provided with one or a plurality of the mounting portions on which each of the second clinching fasteners is mounted; and
a metal substrate in which the respective chip dies can be mounted at e press-fitting positions for the first and second clinching fasteners.

11. The clinching fastener press-fitting method according to claim 10, wherein the mounting portion is a concave portion and/or a convex portion provided at an upper end of the column portion.

12. A clinching fastener press-fitting method for press-fitting a plurality of clinching fasteners into a workpiece that is a metal plate, comprising:
a drilling step of drilling press-fit holes at press-fitting positions of the workpiece to press-fit second clinching fasteners that are press-fitted from a die side of a turret punch press by NC control using the turret punch press;
a fastener mounting step of mounting a predetermined number of the second clinching fasteners taken out from a screw feeder on mounting portions of a fastening jig that guides the second clinching fasteners;
a workpiece mounting step of mounting the workpiece so that the workpiece is superposed on the fastening jig;
a fastener press-fitting step of press-fitting the second clinching fasteners into the press-fit holes of the workpiece mounted on the fastening jig by NC control using the turret punch press; and
a workpiece removal step of removing the workpiece from the fastening jig.

13. The clinching fastener press-fitting method according to claim 12, wherein the fastening jig is a plate-shaped thick plate of a predetermined thickness, which is provided with a concave portion and/or convex portion that is the mounting portion on which each of the second clinching fasteners is mounted.

14. The clinching fastener press-fitting method according to claim 12, wherein the fastening jig consists of:
a substantially cylindrical chip die of a predetermined axial length, which is provided with one or a plurality of the mounting portions on which each of the second clinching fasteners is mounted; and a metal substrate in which the respective chip dies can be mounted at the press-fitting positions for the second clinching fasteners.

\* \* \* \* \*